United States Patent
Komiya et al.

(10) Patent No.: US 6,561,480 B1
(45) Date of Patent: May 13, 2003

(54) MOTOR OPERATED VALVE

(75) Inventors: Yasuo Komiya, Saitama (JP); Seiichi Nakano, Saitama (JP); Hideki Sekiguchi, Saitama (JP); Tokuji Yatsui, Saitama (JP)

(73) Assignee: Kabushiki Kaisha Saginomiya Seisakusho, Tokyo (JP)

( * ) Notice: Subject to any disclaimer, the term of this patent is extended or adjusted under 35 U.S.C. 154(b) by 0 days.

(21) Appl. No.: 09/701,082

(22) PCT Filed: Mar. 24, 2000

(86) PCT No.: PCT/JP00/01803

§ 371 (c)(1),
(2), (4) Date: Nov. 22, 2000

(87) PCT Pub. No.: WO00/58652

PCT Pub. Date: Oct. 5, 2000

(30) Foreign Application Priority Data

Mar. 26, 1999 (JP) ............................................. 11-084842
Jan. 27, 2000 (JP) ....................................... 2000-019312

(51) Int. Cl.[7] ........................ F16K 31/04; F16K 31/50
(52) U.S. Cl. ............ 251/129.12; 251/122; 251/129.05; 251/129.11; 251/267
(58) Field of Search ...................... 251/129.11, 129.12, 251/129.13, 266, 267, 121, 122, 129.05

(56) References Cited

U.S. PATENT DOCUMENTS

| | | | | |
|---|---|---|---|---|
| 3,327,992 A | * | 6/1967 | Billeter et al. ............... | 251/267 |
| 3,488,030 A | * | 1/1970 | Hulme et al. ........... | 251/129.12 |
| 3,616,884 A | * | 11/1971 | Balz ........................ | 251/129.12 |
| 4,332,369 A | * | 6/1982 | Gordon et al. ............... | 251/267 |
| 4,556,193 A | * | 12/1985 | Yoshiga .................. | 251/129.11 |
| 4,650,156 A | * | 3/1987 | Kawahira ............... | 251/129.11 |
| 4,742,989 A | * | 5/1988 | Akagi .................... | 251/129.12 |
| 4,763,874 A | * | 8/1988 | Ogawa .................. | 251/129.11 |
| 4,948,091 A | * | 8/1990 | Satoh et al. ............ | 251/129.11 |
| 4,969,628 A | * | 11/1990 | Reich et al. ........... | 251/129.11 |
| 5,083,743 A | * | 1/1992 | Gordon et al. ............... | 251/267 |
| 5,318,272 A | * | 6/1994 | Smith .................... | 251/129.12 |
| 5,351,935 A | * | 10/1994 | Miyoshi et al. ......... | 251/129.12 |
| 5,364,066 A | * | 11/1994 | Dorste et al. .......... | 251/129.11 |
| 5,419,531 A | * | 5/1995 | Hoehn .................... | 251/129.11 |
| 5,597,009 A | * | 1/1997 | Scherrer et al. ....... | 251/129.11 |
| 5,851,003 A | * | 12/1998 | Aoki et al. ............. | 251/129.11 |
| 5,971,007 A | * | 10/1999 | Harcout et al. ............. | 251/267 |
| 6,003,535 A | * | 12/1999 | Ollivier .................. | 251/129.11 |
| 6,220,571 B1 | * | 4/2001 | Kim et al. ............. | 251/129.11 |
| 6,224,034 B1 | * | 5/2001 | Kato et al. ............. | 251/129.11 |

FOREIGN PATENT DOCUMENTS

| | | | | |
|---|---|---|---|---|
| JP | 0196477 | * | 10/1985 | ............ 251/129.11 |
| JP | 0098777 | * | 4/1989 | ............ 251/129.11 |
| JP | 1-135274 | | 9/1989 | |
| JP | 3260482 A | * | 11/1991 | ............ 251/129.11 |
| JP | 4-78386 A | | 3/1992 | |
| JP | 4-54376 U | | 5/1992 | |
| JP | 6-174129 A | | 6/1994 | |
| JP | 7-305783 A | | 11/1995 | |
| JP | 8-21556 A | | 1/1996 | |

\* cited by examiner

*Primary Examiner*—George L. Walton
(74) *Attorney, Agent, or Firm*—Butzel Long

(57) ABSTRACT

The present invention provides a motor-operated valve having no additional stopper for stopping the rotation of a rotor at fully open and closed states of the valve to allow a reduced number of parts of the valve and to prevent a noise otherwise generated by the abutment of the rotor against a stopper. The motor-operated valve includes a rotor 17 having a shaft 18 formed with an external thread 20. The motor-operated valve also includes a needle valve element 6 having a needle valve head 5 at one end portion thereof and an internal thread 16 engaging with the external thread 20 at another end portion. The valve element has a joining portion 14 for joining the valve head to the internal thread 20. The motor-operated valve also includes a main valve body 1 having a guide portion which stops the rotation of the valve element but allows the axial movement of the valve element. The shaft 18 has an upper end supported by a supporting portion provided on a top wall of a valve housing 22, while a lower end of the shaft is rotatably supported by a bearing 13 secured to the main valve body.

23 Claims, 25 Drawing Sheets

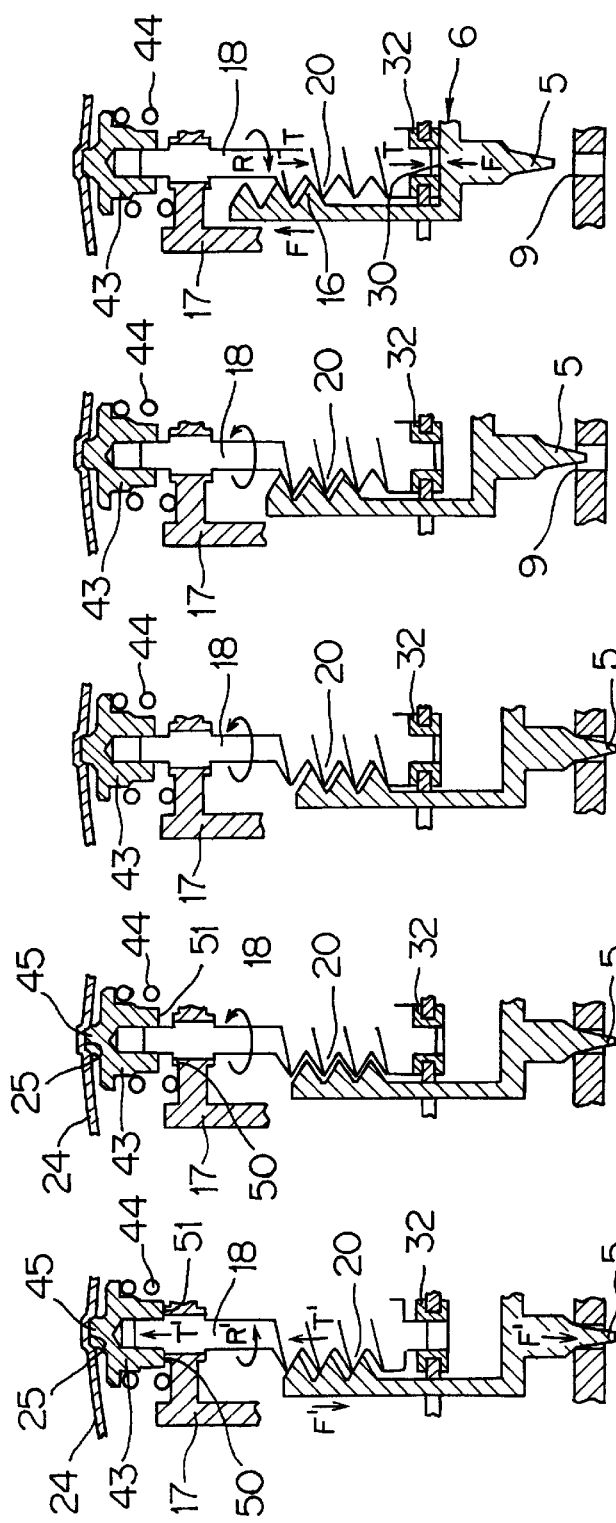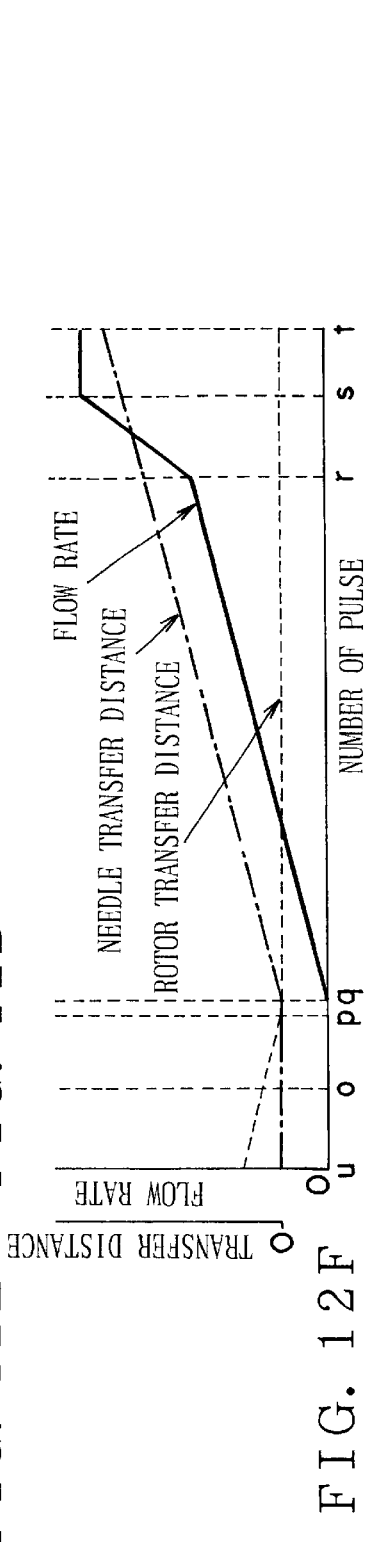

CLOSED STATE OF VALVE

SECTION ALONG A-A

VIEW ALONG ARROW B

OPEN STATE OF VALVE
(INITIALIZATION POSITION)

FULLY OPEN STATE    INVERSE ROTATION STATE

MOTOR OPERATED VALVE

FIELD OF THE INVENTION

The present invention relates to a motor-operated valve incorporated in a refrigerating cycle system such as a refrigerator, an airconditioner, and a freezer for controlling a flow rate of a refrigerant or for opening and closing a flow passage.

BACKGROUND OF THE INVENTION

Conventionally, in a refrigerating, freezing, or air-conditioning cycle of a refrigerator, a freezer, an airconditioner of a heat-pump type, or the like, a refrigerant line has a motor-operated valve for controlling a flow rate of a refrigerant or for switching flow passages. For example, a motor-operated valve used in a heat-pump type airconditioner particularly often operates to adequately control a room temperature. Such a conventional valve generates a loud noise in operation, so that the valve is not desirably positioned in a room but is positioned around an outside machine having a heat exchanger. Thus, the expansion valve for adjusting a flow rate of a refrigerant to control a room temperature is positioned in the outside apart from an in-room apparatus. This is disadvantageous for a control performance such as responsiveness of the heat exchanger. Furthermore, a pipe line for delivering a refrigerant from the in-room apparatus to an outside machine must be located in the outside under a high temperature condition, while the refrigerant in the pipe line is cooled by its expansion in the expansion valve in a cooling operation. Even with an insulation layer, a large quantity of heat radiates from the pipe line into the atmosphere, reducing the efficiency of the heat exchanger.

In addition, an apparatus other than such air conditioners, for example a refrigerator, often uses an expansion valve which is more expensive than a conventional refrigerant flow control device such as capillary tubes. That is because a recent refrigerator has a larger capacity and requires a precise temperature control for a freezing space and a vegetable space thereof. Such a refrigerator is disposed in a room, so that a motor-operated valve such as an expansion valve is positioned in the room. A noise generated from the motor-operated valve must be reduced as much as possible.

FIG. 22 shows a motor-operated valve used in such above-mentioned apparatuses as an example. The valve has a valve main body 60 provided with a first opening 62 communicating with a first passage 61 in a downward axial direction thereof, a second opening 64 communicating with a second passage 63 at a side portion thereof, and a valve chamber 65 communicating the first opening 62 with the second opening 64. On a top portion of the valve main body 60, there is disposed a housing 67 having a bottom cover 66. The housing 67 is mounted with a magnet 68 on an outer surface thereof and accommodates a resin-made rotor 71 having a central pin 70. The rotor 71 is extending downward together with the pin 70 to be inserted into the valve chamber 65. At a lower end of the pin 70, there is provided a needle valve 72 moved forward and backward relative to the first opening 62.

The needle valve 72 has an upper, outer periphery slidably laterally engaging with an inner surface of the valve chamber 65 to constitute a lower guide wall 79. The rotor 71 has a lower, downwardly extended portion 73 formed with an external thread 74, and the valve chamber 65 has an inner surface formed with an internal thread 75 engaging with the external thread 74. Thereby, the rotation of the rotor 71 moves itself upward and downward, since the rotor 71 is engaging with the fixed internal thread 75 through the thread engagement, so that the needle valve 72 integral with the rotor 71 moves upward and downward relative to the first opening 62 to control a fluid flow passing therethrough.

The pin 70 has an upper end 76 projecting from the rotor 71 and opposed to an inner surface of a top portion 77 of the housing 67. The rotor 71 has an outer periphery opposed to an inner periphery of the magnet 68. The inner periphery defines an upper, eccentric, first cylinder 78 and a lower, reduced-diameter, second cylinder 80. The eccentric first cylinder 78 engages the rotor 71 with the magnet 68 not to rotate them relative to each other.

The magnet 68 has a lower end portion extending to an outer periphery of 84 of the valve main body 60. The lower end portion has a rotor support 87. The rotor support 87, as illustrated in FIG. 22, can abut against a stopper pin 88 secured to the valve main body 60. The magnet 68 has an upper end portion defining an upwardly extended portion 90 which can abut against an upper stopper 92. The upper stopper 92 is an outer peripheral, downwardly extended member of a stopper mechanism 91 secured on an inner peripheral wall of an upper cover of the housing 67. The housing 67 has an outer cylindrical surface mounted with coils 93 communicating with an outer device via a connector 94.

In a motor-operated flow control valve 95 having one thus configured needle valve, the application of an electrical power to the magnet 68 rotates the rotor 71. Thereby, the engagement between the external thread 74 formed in the extended portion 73 of the rotor 71 and the internal thread 75 formed in an inner wall of the valve chamber causes the rotation of the rotor 71 to move upward and downward. This moves vertically the needle valve 72 formed in the pin 70 secured on the rotor 71, which changes an open area of the first opening 62 to control a flow rate of a fluid passing therethrough.

When the needle valve 72 fully closes the first opening 62, the rotor support 87 of the magnet 68 abuts against the stopper pin 88 to mechanically stop the rotation of the rotor 71 regardless of a power pulse supply to the coils. Meanwhile, when the needle valve 72 fully opens the first opening 62, the upwardly extended portion 90 of the magnet 68 abuts against the upper stopper 92 of the stopper mechanism 91 so that the rotor 71 also stops.

The motor-operated valves of various types each having a construction other than the above-mentioned one have been used in a freezing cycle system or the like. For example, Japanese Patent Laid-open No. H. 4-68510 discloses a rotor having a rotation stopper mechanism which has been widely used. Referring to the mechanism, a case of a motor-operated valve has an upper cover fitted with a downwardly extended central rod. The central rod is surrounded by a helical guide ring which vertically slidably engages with a slider. The slider has an outer end engaging with a stopper rod raised from the rotor.

The conventional motor-operated valve illustrated in FIG. 22 has the rotor having upper and lower projections abutting against the stoppers provided on a case of the rotor. This arrangement stops the rotation of the rotor when the needle valve is in the fully open state or in the fully closed state. However, the motor-operated valve requires the upper and lower stoppers, which increases the number of parts and causes an increase in an assembling man-hour of the valve. This is a disadvantage of the motor-operated valve. The rotation stopper mechanism disadvantageously requires a further increased number of parts and a further increased assembling man-hour, because the mechanism has the central rod wound by the helical guide spring and the stopper rod raised from the rotor.

In addition, the valve element stops in the fully open and closed positions by abutting the members rotating with the rotor against the stoppers. However, since the engaging threads may have a backlash therebetween, the stopping states of the valve element may not be sufficient.

Furthermore, the stopping members rotating with the rotor abut against the stoppers which are positioned radially apart from the central axis of the rotor. This disadvantageously generates a larger chattering noise when the stopping members hit the stoppers by pulses alternately turning the rotor in the normal or reverse direction around the stopping position, since the stopping members are accelerated in the circumferential speed by the radial distance of the stopping members.

Such alternate pulses are temporarily provided to the rotor when the fully open or closed condition of the needle valve is initialized, or even when the needle valve is in a normal fully open or closed condition, since power pulses may be still supplied in the fully open or closed condition of the needle valve. This generates such a loud noise of the abutment of the stoppers.

Furthermore, the stoppers of the rotation stopper mechanism have problems in dimension control and durability, which decreases the reliability of the motor-operated valve and causes an increased manufacturing cost of the motor-operated valve.

Moreover, the above-mentioned motor-operated valve has the rotor formed with the thread which engages with the opposing thread formed in the valve main body. Thereby, the rotation of the rotor causes the needle valve to move linearly, and the rotor is fully supported by the thread engagement portion. This construction causes a vertical vibration of the rotor due to a backlash of the threads, and the rotor also may deviate from its central axis, resulted in generation of a noise.

Another motor-operated valve used in an airconditioner apparatus has been proposed. The motor-operated valve has a rotor and an actuating shaft which engage with each other through threads so that the rotation of the rotor causes the actuating shaft to move linearly. The actuating shaft moves a valve element vertically but is a body formed separately from the valve element. The rotor is supported not to move vertically, and the valve element is moved vertically but is not rotated. However, the motor-operated valve still has stoppers to stop the rotation of the rotor at fully open and closed positions of the valve element. The motor-operated valve has the disadvantages of an increased number of parts, an increased assembling man-hour, a less durability, etc.

Therefore, an object of the present invention is to provide a motor-operated valve which can stop appropriately a needle valve element without an additional stopping mechanism. The motor-operated valve has the advantages of a less number of parts, a reduced vibration, and a reduced noise.

Another object of the present invention is to provide a motor-operated valve which has a flat spring between a bearing and a needle valve to eliminate an impact noise otherwise generated when the needle valve directly abuts against the bearing.

SUMMARY OF THE INVENTION

For achieving the objects, a motor-operated valve according to the present invention includes a rotor having a shaft formed with an external thread and a needle valve element. The valve element has a valve head at one end portion thereof and an internal thread engaging with the external thread at another end portion. The valve element also has a joining portion for joining the valve head to the internal thread. The motor-operated valve also includes a main valve body having a guide portion which stops rotation of the valve element but allows an axial movement of the valve element. The shaft has an upper end rotatably supported by a supporting portion provided on a top wall of a valve housing, while a lower end of the shaft is rotatably supported by a bearing secured to the main valve body.

Another motor-operated valve according to the present invention includes a rotor having a shaft formed with an external thread and a needle valve element. The valve element has a valve head at one end portion thereof and an internal thread engaging with the external thread at another end portion. The valve element also has a joining portion for joining the valve head to the internal thread. The motor-operated valve also includes a main valve body having a guide portion which stops rotation of the valve element but allows an axial movement of the valve element. The main valve body has a valve seat. The shaft has an upper end supported by a supporting portion provided on a top wall of a valve housing, while a lower end of the shaft is rotatably supported by a bearing secured to the main valve body.

The internal thread may be made of a synthetic resin material.

The joining portion comprises a pair of opposing rods. The bearing has a guide for slidably guiding the rods, and the guide stops the rotation of the valve element. The bearing has a rotation stopper projection engaging with the valve element. The bearing also has a support recess receiving the lower end of the shaft to receive a thrust force of the shaft. Furthermore, the bearing has a bearing bush made of an elastic material. The bush has a hole receiving the lower end of the shaft. The bush also has a thrust receiving portion protruding from each surface of the bearing. The bearing may be a flat plate made of a synthetic resin material and having a central hole receiving the lower end of the shaft. The bearing may have a spring upwardly urging the lower end of the shaft.

The valve element has a recess formed on an outer peripheral surface thereof. In the recess, there is provided a slider made of a low friction material. The shaft has an end directly engaging with a recess formed on a top wall of a valve housing. Alternatively, the shaft may have an end rotatably supported by a shaft supporting piece, and the shaft supporting piece has a projection engaging with a recess formed on a top wall of the valve housing. Between the bearing and a top surface of the rotor, there may be provided a compressed spring for urging downward the rotor. Between the valve element and the valve main body, there may be provided another compressed spring urging downward the valve element. Between the valve element and the valve main body, there may be provided further another compressed spring urging upward the valve element. The external thread may be provided separately from the valve element to be integrated on the valve element afterward. The needle valve may be provided separately from the valve element to be integrated on the valve element afterward. The valve head may have a disengagement preventing member at a top portion thereof and may have a spring receiving portion at an intermediate portion thereof. The valve head is disposed at a lower end of the valve element. Between the spring receiving portion and the lower end of the valve element, there is provided further another compressed spring. The joining portion may have an upper end shoulder abutting against a flat face of the bearing when the valve head is fully closed, so that the rotation of the rotor stops.

The internal thread may be preliminarily formed as an insert from the same synthetic resin material as the valve element. The bearing may be made of a sintered metal.

Between the bearing and the valve head, there may be provided a plate piece having an elastic character for urging downward the valve element at an initialization position of the valve element.

BRIEF DESCRIPTION OF THE DRAWINGS

FIG. 3A shows a first example of the bearing plate while FIG. 3B shows a second example of the bearing plate;

FIG. 4A shows steps for inserting the bearing plate into a space of a joining portion of the valve element while FIG. 4B shows a next step for setting the bearing plate on the valve element;

FIGS. 12A to 12E are schematic views generally showing operation of the motor-operated valve of FIG. 11, which sequentially show a fully open state, a normal use state, a state in which a valve head rests on a valve seat, a state in which power pulses are further supplied for closing the needle valve, and a state in which power pulses are furthermore supplied for closing the needle valve, and FIG. 12F is a graph showing a flow rate of a fluid, a needle transfer distance, and a rotor transfer distance relative to the number of power pulses supplied to the motor-operated valve;

FIG. 17A shows a first example of the support member while FIG. 17B shows a second example of the support member;

FIG. 18A is a plan view while FIG. 18B is a sectional view;

FIG. 19A is a plan view while FIG. 19B is a sectional view;

FIGS. 24A to 24C are sequentially a front sectional view, a sectional view taken along line A—A, and a view taken in the direction of arrow B;

PREFERRED EMBODIMENTS OF THE INVENTION

Figure 1:
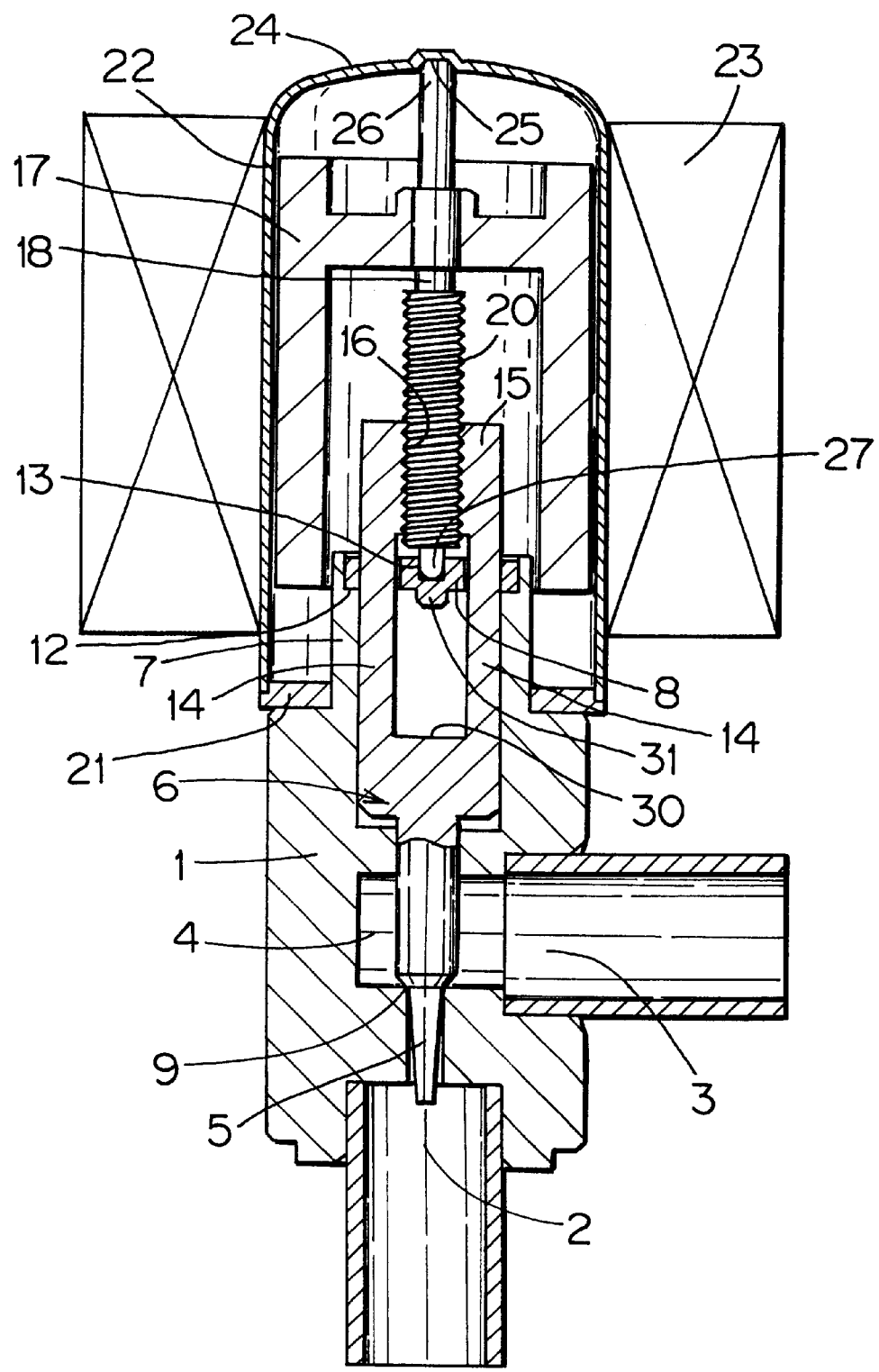
FIG. 1 is a sectional view showing a motor-operated valve according to the present invention, in which the valve is in a fully closed position.

Referring to the accompanied drawings, embodiments of the present invention will be discussed. FIG. 1 shows an embodiment of a motor-operated valve according to the present invention. The motor-operated valve has a main body 1 having a first port 2, a second port 3, and a valve chamber 4 disposed between the first port 2 and second port 3. The valve chamber 4 receives a needle valve element 6 with a valve head 5 positioned at a lower end of the valve element 6. The valve element 6 is slidable in the valve chamber 4 vertically in FIG. 1.

The valve element 6 is supported by an upwardly extended cylinder 7 so as to be slidable vertically. The cylinder 7 has a bearing 8 at an upper end thereof.

The bearing 8, as shown in a plan view of FIG. 3A, has a guide recess 10 at each side thereof and has an outer periphery 11 which is pressed into or clamped by a step 12 provided at an upper end of the cylinder 7 to be secured thereto. The bearing 8 has also a supporting hollow 13 at a central portion thereof.

The bearing 8, for example as illustrated in FIG. 3B, has a stopper projection 19 protruding from the outer periphery 11. The stopper projection 19 engages with an engagement recess provided at an upper, outer surface of the cylinder 7 for positioning the bearing 8.

Each guide recess 10 of the bearing 8 engages slidably with one of left and right joining portions 14 of the valve element 6. The joining portion 14 is formed with an upper internal thread portion 15 having an internal thread 16 at a central part thereof. The internal thread 16 engages with an external thread 20 formed in a shaft 18 secured to a magnet rotor 17. The valve element 6 has the valve head 5 formed at a lower portion thereof. The valve head 5 is movable relative to a valve seat 9.

The main body 1 has a lower cover 21 fitted at an upper portion thereof by brazing to close a lower space of the main body 1. A housing 22 is joined to the lower cover 21 by welding or the like so that the housing 22 is sealed there. The rotor 17 can rotate in the housing 22 with an inner wall of the housing 22 being positioned close to the rotor 17. On an outer surface of the housing 22, there is fitted with a stator 23 having wound coils. The housing 22 has a top wall 24 formed with an inner hollow 25 at a central portion thereof. The hollow 25 engages with an upper end 26 of the shaft 18, and a lower end 27 of the shaft 18 engages with the supporting hollow 13 of the bearing 8. Thereby, each end of the shaft 18 joined to the rotor 17 is supported one of the hollows so that the rotor 17 can rotate without an undesirable vertical movement thereof.

Figures 4A, 4B:
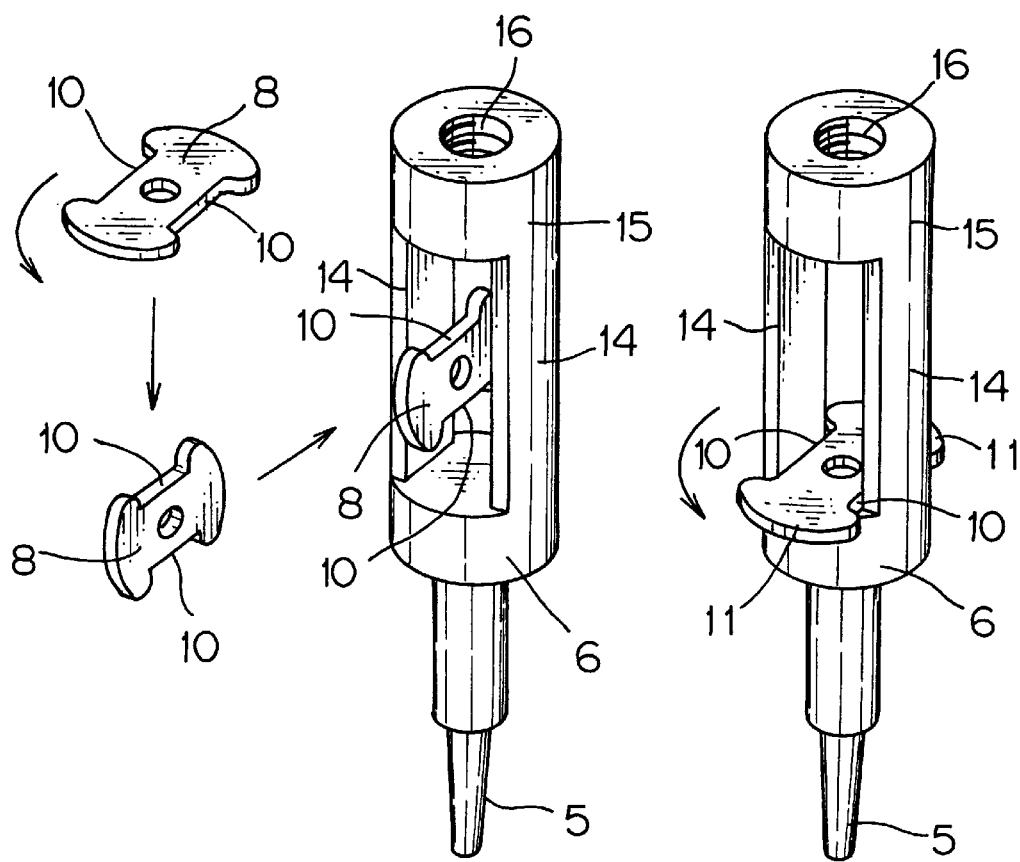
FIGS. 4A and 4B are perspective views showing steps for assembling the bearing plate in a needle valve element of the motor-operated valve.

For securing the bearing 8 on the upper end of the cylinder 7 of the main body 1, first, as illustrated in FIG. 4A, the bearing 8 is oriented vertically so that it is inserted into a space defined within the joining portions 14 of the valve element 6. Next, as illustrated in FIG. 4B, the bearing 8 is turned to become horizontal and each guide recess 10 receives one of the joining portions 14. The thus assembled valve element 6 and bearing 8 are downwardly inserted into the cylinder 7 of the main body 1, and each outer periphery 11 of the bearing 8 is secured to the step 12 formed in an upper end portion of the cylinder 7 by press-fit or the like.

The thus configured motor-operated valve shown in FIG. 1 is in a valve closed position in which the valve head 5 is abutting against the valve seat 9. Providing power pulses to the coils rotates the rotor 17 in response to the number of the pulses, so that the shaft 18 unitarily joined to the rotor 17 rotates with the upper and lower ends of the shaft 18 being supported by the hollows. However, the valve element 6 does not rotates, since the rotation is prevented by the engagement of each joining portion 14 with the guide recess 10 provided at each side of the bearing 8. Meanwhile, the valve element 6 moves upward by the engagement of the external thread 20 of the shaft 18 and the internal thread 16, so that the valve head 5 disengages from the valve seat 9 to be in an open state of the valve.

Figure 2:
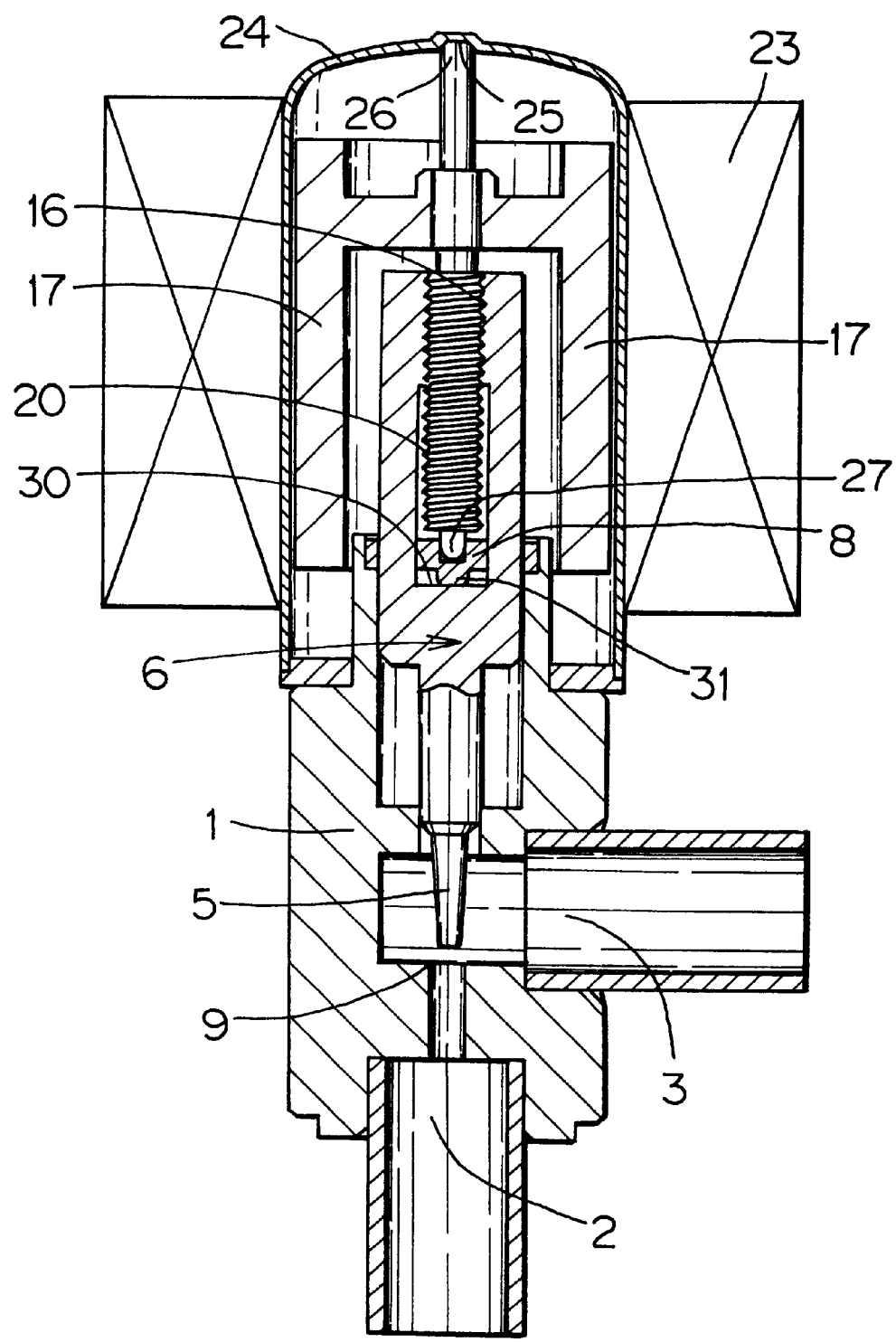
FIG. 2 is a sectional view showing the motor-operated valve, in which the valve is in a fully open position.
Figures 5A, 5B, 5C, 5D, 5E:
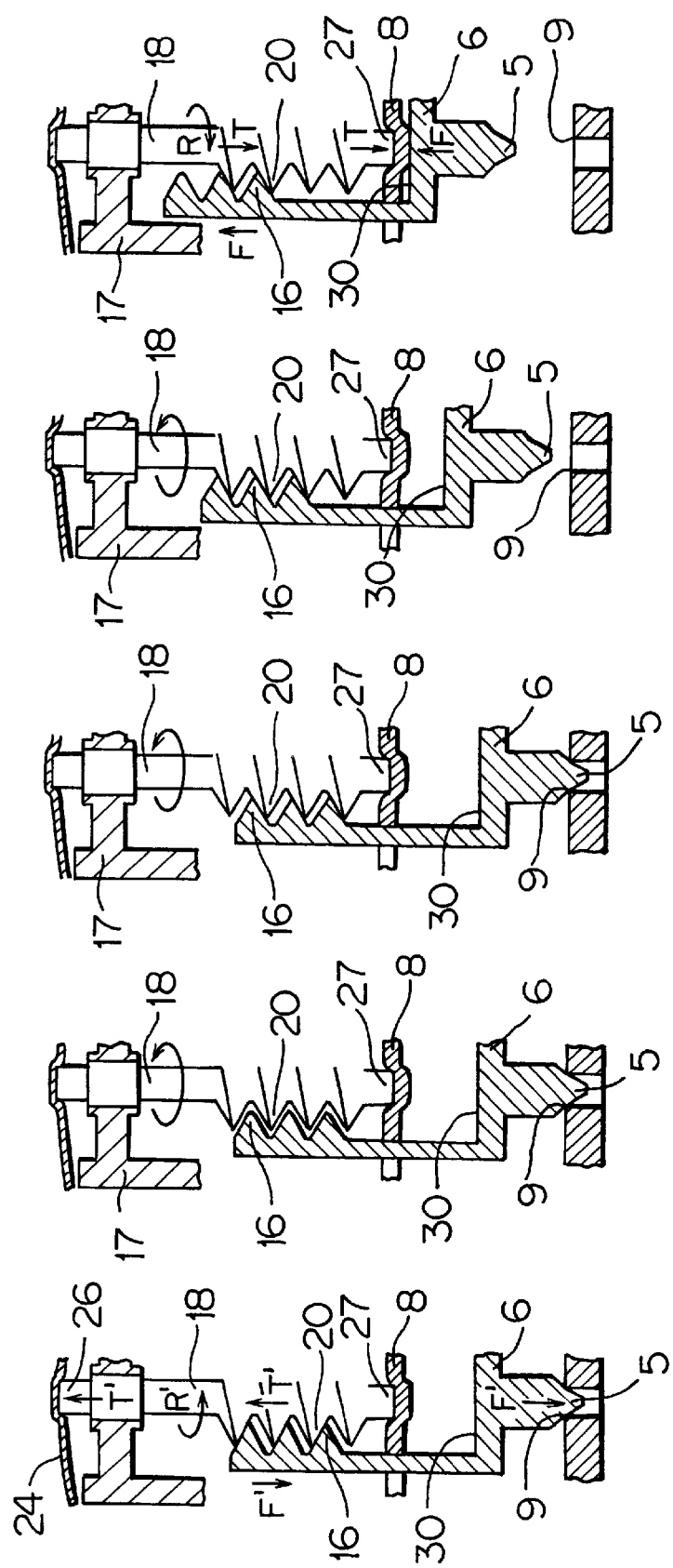
FIGS. 5A and 5E are schematic views generally showing operation of the motor-operated valve, sequentially showing a fully open state, a normal use state, a state in which a valve head rests on a valve seat, a state in which power pulses are further supplied for closing the needle valve, and a state in which power pulses is furthermore supplied for closing the needle valve.

Further providing power pulses to the coils for opening the motor-operated valve continues to move the valve element 6 upward, so that an inner bottom surface 30, which is formed at a central portion of the valve element 6 near a lower end of the joining portion 14, abuts against a lower end of a projection 31 formed on a rear central surface of the bearing 8 as illustrated in FIG. 2. This state is schematically shown in FIG. 5A, in which the valve is in a fully open state and the internal thread 16 is pushing the external thread 20. In this state, a further rotational force R of the external thread 20, which is clockwise in FIG. 5A, is provided. Thereby, the projection 31 of the bearing 8 is pinched by the lower end 27 of the shaft 18 and the inner bottom surface 30 of the valve element 6. As illustrated in FIG. 5A, the rotational force R causes a downward thrust force T exerted on the shaft and an upward reaction force exerted on the valve element, which pinches the bearing 8. This provides a friction force between the lower end 27 of the shaft 18 and the bearing 8 to stop the rotation of the rotor 17 even when power pulses acting to move the valve toward the open position are further provided.

Thus, the valve opening movement stops without a specified stopper at a fully open position of the valve. The fully open position is correctly determined relative to the valve element. In the discussion of the present invention, the fully open position is named as an initialization position which is a reference position for adjustment of the valve. In this initialization position, a further provision of power pulses acting to open the valve element generates a temporary inverse pulse to rotate the rotor in reverse. However, the reverse rotational force is weakened since the external thread 20 and the internal thread 16 are abutting against each other with a strong force so that a significant friction force is generated therebetween. This allows a reduction of a noise caused by the inverse pulses.

Next, pulses for moving the valve element toward its closed position are provided to the coils of the valve which has been in the fully closed position. Thereby, the rotor, as illustrated in FIG. 5B, rotates counterclockwise so that the valve element moves downward without rotation thereof because of the aforementioned rotation preventing mechanism. This causes the valve head 5 to reduce the open area of the valve seat 9 at the close position of the valve. In each of FIGS. 5B to 5E, the rotation of the rotor is directed toward the valve closed position. In these states, the valve element 6 moves downward with the internal thread 16 of the valve element 6 hanging the external thread 20 of the shaft 18 because of the weight of the valve element 6, for example as illustrated in FIG. 5B. A further provision of pulses to the coils further moves the valve element 6 until the valve head 5 abuts against the valve seat 9 to stop the valve element as illustrated in FIG. 1. Since the valve element 6 moves downward without rotation thereof, the valve head 5 abuts against the valve seat 9 without its rotation. This eliminates a frictional wear of a valve seat which has been appeared in a conventional motor-operated valve having a needle valve element that moves downward with rotation thereof so that a needle valve head abuts a valve seat with a torsion force.

In an initial closed state of the valve element 6 which is illustrated in FIG. 6C, the valve head 5 is abutting against the valve seat 9 while the external thread 20 is hanging the internal thread 16. A further provision of pulses to the rotor 17 for closing the valve does not move the valve element 6 further downward, while the rotor 17 rotates counterclockwise, as illustrated in FIG. 6C, freely by a backlash distance between the threads. During a transition state illustrated in FIG. 5D, the threads disengage with each other. However, the disengagement duration due to the backlash is a very short time and the weight of the valve element acts to close the valve seat. This has little effect on operation of the valve.

After the rotor rotates to vertically travel by the thread backlash distance, a rotational force R' of the shaft 18 causes a force F' abutting the valve element 6 against the valve seat 9 with a reaction force T' moving the shaft 18 upward as illustrated in FIG. 5E. Thereby, the shaft 18 and the valve element 6 push each other between the top wall 24 of the housing 22 supporting the upper end 26 of the shaft 18 and the valve seat 9 abutting against the valve head 5. Thus, the valve head 5 is urged against the valve seat 9 to ensure the closing operation of the valve. In the closing operation, the valve head 5 is urged against the valve seat 9 without rotation thereof, so that no friction force is generated between them to prevent a frictional wear of the valve seat 9 and the valve head 5. Moreover, a further provision of pulses to the rotor 17 for closing the valve causes no rotation of the rotor 17, since a frictional force is generated between the threads. This serves as a stopper for the rotor 17.

The fully closed position may be defined as an initialization position. However, the fully open position is more preferable for an initialization position than the closed position. That is because, in the closed position, the valve element and the shaft each are urged against the valve seat or the valve housing, which may cause a deflection of the housing. Furthermore, the housing has a manufacturing dimension tolerance. Accordingly, the closed position may not be correctly determined.

The thus configured motor-operated valve can stop the rotation of the rotor at the open and closed positions of the valve without preparing a specified stopper used in the conventional motor-operated valve. In addition, the valve head abuts against the valve seat without rotation thereof, while the rotor stops in the valve fully closed position with no frictional force between the needle valve head and the valve seat. Note that such a stopping mechanism of the rotor uses an axial force of the valve element so that no noise is substantially generated unlike the conventional art, even when the rotor temporarily rotates in reverse due to a further provision of driving pulses for initializing the valve position or the like during the fully open or closed state of the valve. In addition, the motor-operated valve of the embodiment has the shaft 18 axially supported at the upper and lower ends. An appropriate design of the length between the axial end supports can prevent a vertical movement of the rotor during the aforementioned reverse rotation of the rotor. This is also effective to generate no noise.

In the fully open or closed position of the motor-operated valve, a significant frictional force may be generated between the external and internal threads due to an axial force exerted on valve element. The frictional force may act not to rotate the rotor when the rotor should be normally rotated in reverse to move the valve element toward the opposed position. To eliminate this disadvantage, a multithread will be applied to the threads of the shaft and the valve element. Alternatively, in the aforementioned motor-operated valve, the external thread 20 and the internal thread 16 each may have a pitch slightly different from each other. The pitch difference provides a stopper mechanism for stopping the rotation of the rotor when the rotor has rotated by a predetermined number of turns from the fully open or closed position of the valve element.

Figure 6:
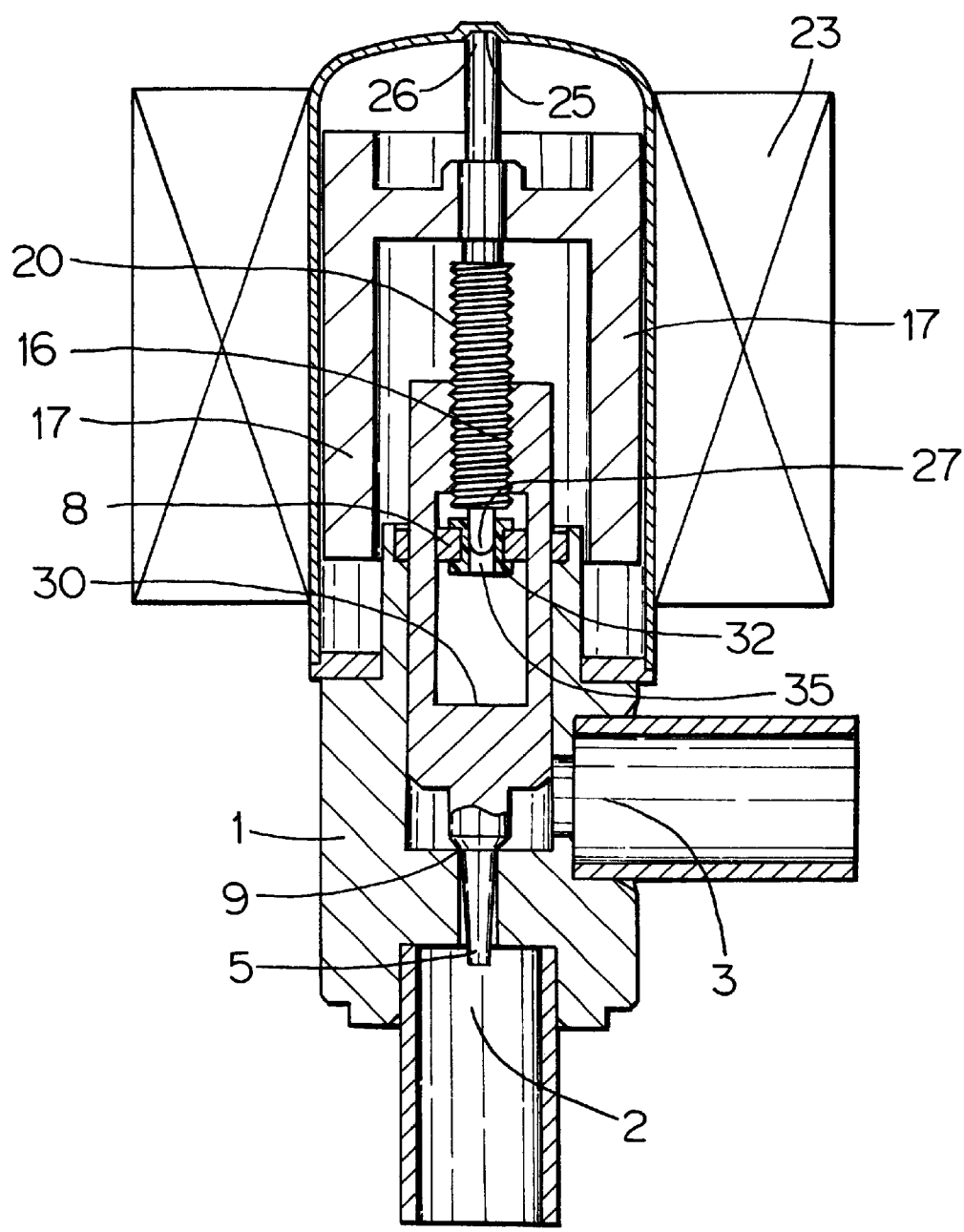
FIG. 6 is a sectional view showing an embodiment of the present invention which includes a bush for a bearing.
Figures 7A, 7B, 7C:
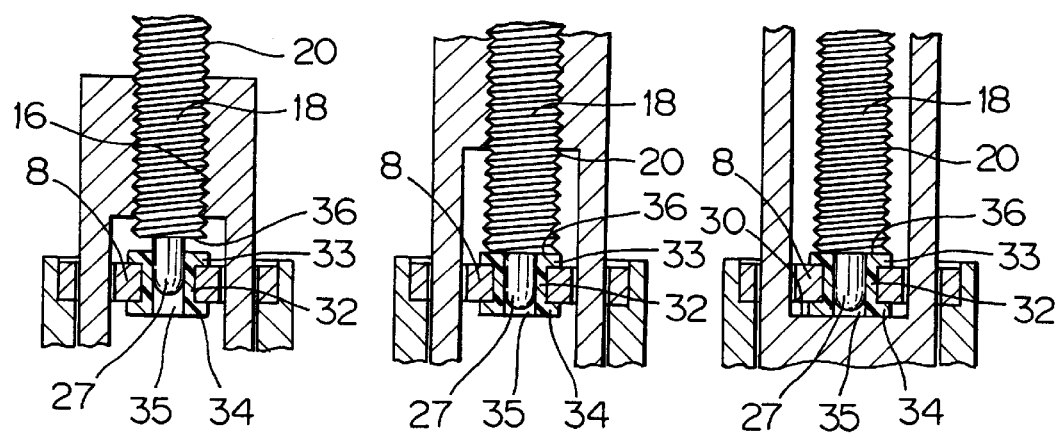
FIGS. 7A to 7C are sectional views showing operation of the motor-operated valve particularly in relation to the bearing bush of FIG. 6, which sequentially show a fully open state, a state in which a valve head rests on a valve seat, and a state in which power pulses are further supplied for closing the needle valve.

Another embodiment of a motor-operated valve according to the present invention has a construction illustrated in FIG. 6. FIG. 7 is a partial enlarged view showing a bearing plate illustrated in FIG. 6. A bearing plate 8 has a central through hole fitted with a bearing bush 32 made of a rubber or a synthetic resin elastomer. The bearing bush 32 has an upper flange 33 which is an upper thrust receiving portion and has a lower flange 34 which is a lower thrust receiving portion. The bearing bush 32 has a central through hole 35 which receives downwardly the lower end 27 of the shaft 18. The lower end 27 is rotatable and vertically slidable relative to the bearing bush 32, which serves as a radial bearing. FIGS. 7A to 7C show sequentially a fully open state, a normal operating state, and a fully closed state of the valve.

As well as the previously mentioned embodiment, in the thus constructed valve, the inner bottom surface 30 of the valve element 6 abuts against a lower surface of the bearing bush 32 when the inner bottom surface 30 comes close to the bearing 8 at a fully open state of the valve as illustrated in FIG. 7A. At the same time, an end face 36 formed in a lower end portion of the shaft 18 abuts against an upper surface of the upper flange 33 of the bearing bush 32. Accordingly, the inner bottom surface 30 of the valve element 6 and the lower end of the shaft 18 pinch the bearing via the intermediate bearing bush 32 made of a resilient material. This decreases a noise due to inverse pulses generated during the initialization of the valve.

The motor-operated valve of this embodiment has the shaft 18, the lower end portion of which is supported by the abutment of the end face 36 against the upper surface of the upper flange 33 of the bearing bush 32. Thus, in a normal operating state of the valve, the thrust receiving portion bears a load of the rotor as illustrated in FIG. 7B. In the fully open state of the valve element, as shown in FIG. 6 and in a partial enlarged view of FIG. 7C, the valve head 5 abuts against the valve seat 9. A further rotation of the rotor in the same direction moves the shaft upward, so that the end face 36 of the shaft 18 disengages from the bearing bush 32. Then, the rotor stops in the same way as the operation described of FIG. 5E.

The motor-operated valve of this embodiment has no such separate valve chamber 4 provided in the motor-operated valve of FIGS. 1 and 2 but has a chamber in which the valve element slides vertically. The chamber has a lower portion defining a communication space for the first and second ports 2, 3. The second port 3 is formed in a side wall of the chamber. This configuration allows a reduced height and a compact design of the motor-operated valve.

Figure 8:
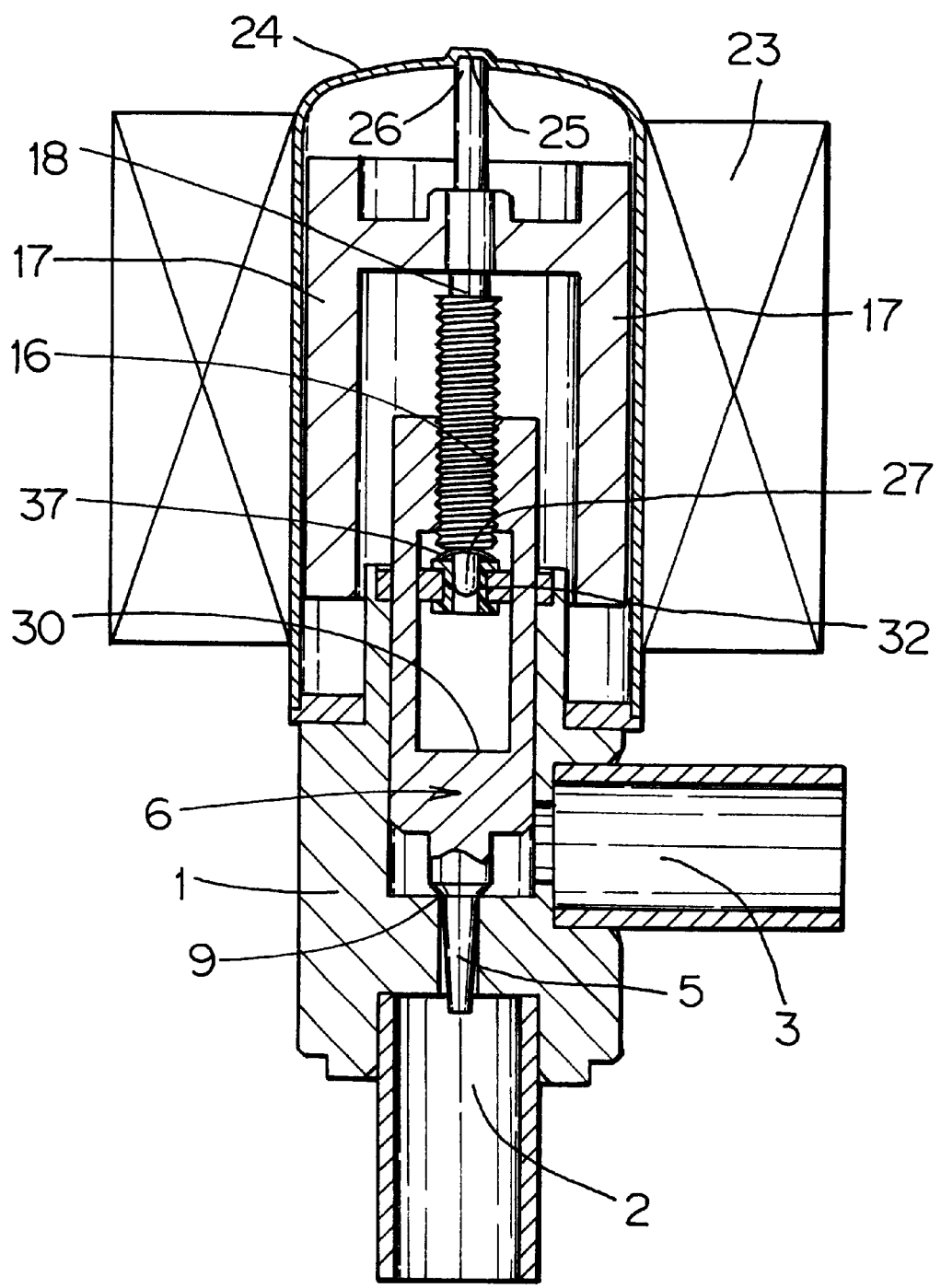
FIG. 8 is a sectional view showing an embodiment of the present invention which includes a saucer-shaped spring.

FIG. 8 shows a modified example of the motor-operated valve according to the present invention, and FIG. 9 is a partial enlarged view particularly showing a bearing plate of FIG. 8. That is, a saucer-shaped flat spring 37 is additionally provided in the motor-operated valve shown in FIGS. 6 and 7. The flat spring 37 has a central through hole receiving the lower end 27 of the shaft 18. The flat spring 37 is compressed and is disposed between an upper surface of the upper flange 33 of the bearing bush 32 and the end face 36 of the shaft 18 to normally urge the shaft 18 upward.

Figure 9B:
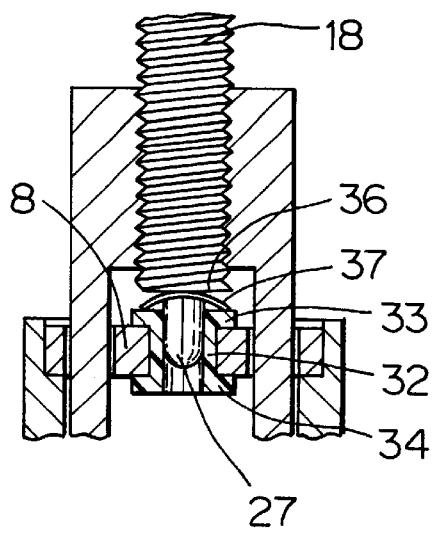
FIGS. 9A and 9B are sectional views showing operation of the motor-operated valve particularly in relation to the saucer-shaped spring, FIG. 9A showing a fully open state, FIG. 9B showing a state in which power pulses are further supplied for closing a valve head after the valve head abuts against a valve seat.

The flat spring 37 provides a resilient resistant force to the shaft 18 when the rotor rotates in reverse temporarily due to inverse pulses generated in the valve closed state shown in FIG. 8 and FIG. 9B. This allows a reduced noise of the motor-operated valve.

The flat spring 37 may be designed to have a small resiliency so that the weight of the rotor is enough to substantially fully compress the flat spring 37 during a normal operation state of the valve. If desired, the flat spring 37 may be designed to have a larger resiliency to slightly raise the shaft 18 to limit the vertical movement of the shaft 18 during a normal operation state of the valve.

Figure 9A:
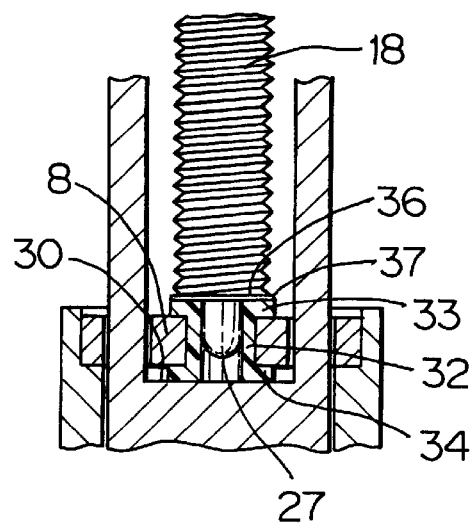

In a fully open state of the valve having the flat spring 37, the inner bottom surface 30 of the valve element and the lower end of the shaft 18 pinch the bush 32 of the bearing 8 therebetween in the same way as the motor-operated valve of FIG. 6. Furthermore, as illustrated in FIG. 9A, the flat spring 37 is fully compressed to be flat on the pinched bearing bush 32.

This provides an improvement in shock absorption as compared with the motor-operated valve shown in FIG. 7A having only the bearing bush 32 made of a resilient material. That is, an impact force due to an inverse pulse generated during an initializing operation in the fully open state of the valve may be reduced, allowing a less noise of the valve.

The saucer-shaped spring may be replaced by a washer-type flat spring for normally urging the shaft upward. The flat spring may have a plurality of slits formed in outer and inner peripheries thereof for giving a desired resiliency to the flat spring. Note that such a flat spring may be applied to the bearing plate shown in FIG. 1 without a bearing bush.

Figure 10:
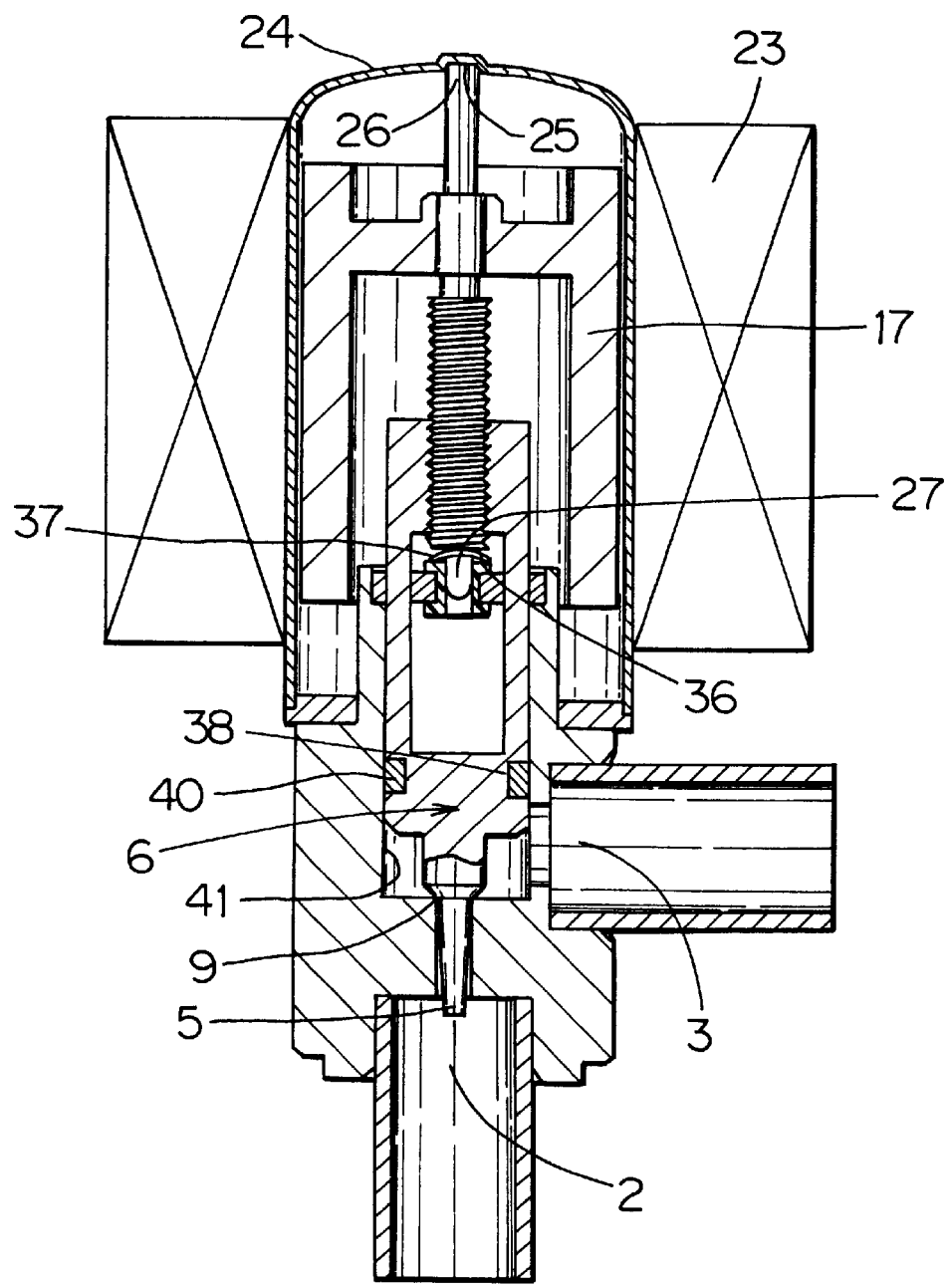
FIG. 10 is a sectional view showing an embodiment of the present invention which includes a needle valve element having a slider.

FIG. 10 shows another motor-operated valve embodying the present invention. The motor-operated valve has a groove 38 formed in a side wall of the valve element 6 of the previously described embodiments. The groove 38 receives a slider piece 40 having a less frictional resistance. The slider piece 40 of the valve element 6 is guided by an inner, slide guiding surface 41 of the main body 1, so that the valve element 6 is stable laterally during an operation state of the valve. Accordingly, a noise due to the abutment of the valve element 6 against the slide guiding surface 41 of the main body 1 or due to the sliding movement of the valve element 6 relative to the slide guiding surface 41 may be reduced.

Figure 11:
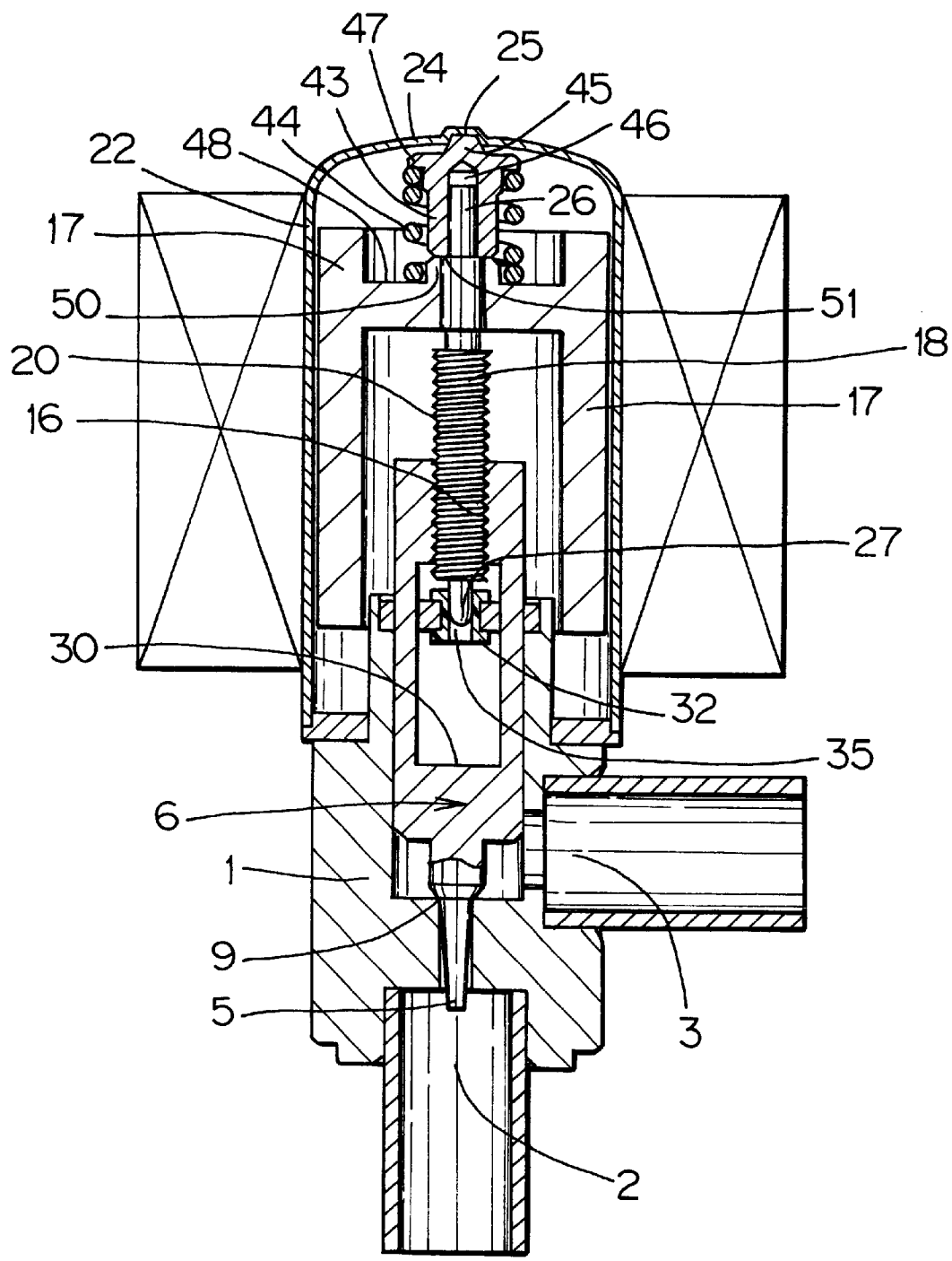
FIG. 11 is a sectional view showing further another embodiment of a motor-operated valve according to the present invention.

FIG. 11 shows another motor-operated valve embodying the present invention. The motor-operated valve has a shaft 18 with a lower end 27. The lower end 27 is received in a through hole 35 of a bearing bush 32 fitted to the bearing 8 to be supported therein in the same way as the embodiment of FIG. 6. However, the motor-operated valve is different from the embodiment of FIG. 6 in that the motor-operated valve has a shaft supporting piece 43 supporting the upper end 26 of the shaft 18 and has a downwardly urging spring 44 for lifting the rotor 17 and the shaft 18. More specifically, the shaft supporting piece 43 has an engagement projection 45 at an upper end portion thereof, and the engagement projection 45 engages with the hollow 25 formed on the top wall 24 of the housing 22. The shaft supporting piece 43 has a central shaft bearing recess 46 receiving the upper end 26 of the shaft 18. Between a spring supporting portion 47 formed an outer periphery of the shaft supporting piece 43 and an upper surface 48 of the rotor 17, there is mounted the downwardly urging spring 44 to be compressed therein.

Operation states of the motor-operated valve of FIG. 11 are shown in FIGS. 12A to 12E, and FIG. 12F shows a flow rate of a fluid passing through the valve relative to operation states of the valve. The motor-operated valve operates substantially in the same way as the motor-operated valve shown in FIG. 5. In FIGS. 12 A to 12E, the same reference numerals and arrow heads as those of FIGS. 5A to 5E show the same components or directions as FIGS. 5A to 5E. Specifically in the motor-operated valve of FIG. 11, a further provision of pulses for driving the valve element toward the valve closed position in a fully closed state shown in FIG. 12C urges the valve element 6 against the valve seat 9. Thereby, the rotor 17 moves upward to be in a state shown in FIG. 11 or in a partial view of FIG. 12E via a state shown in FIG. 12D. In FIG. 12E, a shoulder 50 of the rotor 17 is abutting against a lower end surface 51 of the shaft supporting piece 43, and the shaft supporting piece 43 is urged upward by the spring 44. Thereby, the engagement projection 45 of the shaft supporting piece 43 engages with and abuts against the hollow 25 of the top wall 24, so that the upward movement of the rotor 17 is stopped and the rotation of the rotor 17 is also stopped due to a frictional force cause by the abutment.

A further provision of pulses for driving the valve element toward the valve closed position causes a temporary reverse rotation of the rotor 17 as described above. At the same time, the shaft 18 moves downward slightly, since the external thread 20 of the shaft 18 is engaging with the internal thread 16 of the valve element 6 and the valve head 5 is abutting against the valve seat 9 so that the valve element 6 can not move further downward. In this state, the external thread 20 tends to disengage from the internal thread 16. However, in this embodiment, the spring 44 urging the shaft 18 downward causes a lower surface of the external thread 20 to abut against an upper surface of the internal thread 16. Thus, the external thread 20 and the internal thread 16 do not disengage from each other, eliminating a noise due to chattering of the threads.

In addition, the spring 44 urges the rotor 17 downward, so that the external thread 20 contacts the internal thread 16 invariably during the vertical movement of the rotor 17 and the valve element 6 is urged downward. Thereby, the valve head 5 does not disengage from the valve seat 9 in the closed position, and no fluid leak occurs even at a reverse rotation of the rotor 17.

FIG. 12F is a graph showing variations of the transfer distance of the rotor 17, the transfer distance of the valve head 5, and a flow rate of a fluid passing through the motor-operated valve of the embodiment. FIGS. 12A to 12E each correspond sequentially to a state in which the motor-operated valve is provided with pulses the number of which is s to t, q to s, q, p to q, or 0 (zero). A state in which the number r of pulses are provided corresponds to just when a tip of the valve head 5 has disengaged from the valve seat 9. The number u shows a state in which a minus pulse is provided to the motor-operated valve.

As clearly illustrated in FIG. 12F, the valve head 5 begins to move upward when the number q of pulses is provided to the motor-operated valve. As illustrated in FIG. 12F, the flow rate increases along a solid line proportional to the upward transfer distance of the needle as shown by a chain line. The motor-operated valve operates normally within this range. That is, after the tip of the valve head 5 has passed the valve seat 9 at the pulse number r, the flow rate increases steeply with increase of the number of pulses. At the pulse number s, as illustrated in FIG. 12A, the bearing bush 32 is sandwiched by a lower end of the shaft 18 and the inner bottom surface 30 of the valve element 6 to stop the upward movement of the needle. A further provision of pulses up to the number t ensures the sandwiching state, and an energy supply to the coils is interrupted.

In the present invention, the fully open position of the valve is defined as an initialization position of the valve. At an initialization of the valve, pulses for rotating the rotor toward the valve opening direction are further provided to the motor-operated valve. Thereby, the rotor 17 rotates in reverse slightly, but the rotor 17 does not move vertically, since the spring 44 is urging the rotor 17 downward toward the bearing bush 32. Thus, the rotor 17 only moves forward and backward in the rotational directions thereof in response to plus or minus pulses provided to the motor-operated valve. Note that the valve element 6 moves vertically due to the engagement of the external thread 20 and the internal thread 16 by the rotational movement of the rotor 17. However, the vertical movement of the valve element 6 may cause no change of the flow rate of the fluid passing through the valve, when the motor-operated valve is constructed such that a maximum flow rate of the fluid is provided before the fully open state of the valve element 6 or such that several driving pulses are needed to reach the fully open state of the valve element 6 after the valve has become a maximum flow rate condition. The spring 44 urges the rotor 17 downward during a period corresponding to the supplied number of pulses between q to t so that the rotor 17 keeps the lowest position as shown by a dotted line in FIG. 12F.

Meanwhile, during the operation for closing the valve from the fully open state, the valve acts in a reverse way of the above-mentioned operation to reach a position associated with the pulse number q. Thereafter, a further provision of pulses to close the valve causes a lower surface of the internal thread 16 to disengage from an upper surface of the external thread 20 as illustrated in FIG. 12D and engages an upper surface of the internal thread 16 with a lower surface of the external thread 20 as illustrated in FIG. 12E. This state corresponds to a state associated with the pulse number p of FIG. 12F. The pulse number p, which is a small value, corresponds to a backlash distance of the threads. During the provision of the pulse number p, the rotor 17 does not move vertically due to the force of the downwardly urging spring 44, so that the needle also does not move.

A further provision of pulses for closing the valve moves the shaft upward as previously discussed, so that the rotor 17 move upward as illustrated by a dotted line in FIG. 12F. Thereafter, the valve finally reaches a state associated with a minus pulse number u via a state associated with the pulse number 0. In the final state, which is illustrated in FIG. 12E, the shoulder 50 of the rotor 17 abuts against the lower end surface 51 of the shaft supporting piece 43 to stop the upward movement of the rotor. During this operation, the valve head 5 is urged against the valve seat 9 not to move as illustrated by a solid line in FIG. 12F. A further provision of pulses for closing the valve causes the rotor to rotate in reverse so that the shaft 18 moves slightly downward to tend to disengage the external thread 20 from the internal thread 16. However, the spring 44 is urging the shaft 18 downward so that a lower surface of the external thread 20 is being abutted against an upper surface of the internal thread 16. Thus, the external thread 20 and the internal thread 16 do not disengage from each other to prevent generation of a noise. Moreover, since the spring 44 invariably urges the valve element 6 downward so that the valve head 5 may not disengage from the valve seat 9, preventing fluid leak of the valve element 6.

In the above-mentioned embodiment, the fully open closed position is used for initialization of the valve movement. The fully closed position shown in FIG. 12E also may be defined as an initialization position. In the fully closed state, a further provision of pulses for closing the valve causes the rotor to rotate in reverse. However, the spring 44 is urging the external thread 20 against the internal thread 16, generating no noise due to repeated hits of the external thread 20 against the internal thread 16 during the initialization of the valve.

Nevertheless, the initialization in the closed position is not enough to obtain a precise initialization position. That is because the distance from the initialized closed position, in which the valve head rests on the valve seat, to the fully open position is determined with an accumulation of dimensional allowances of the main body 1, the valve head 5, the joining portion 14, the shaft 18, the shaft supporting piece 43, the housing 22, etc. Furthermore, the housing 22 may deflect by the reaction force from the shaft 18. Accordingly, the fully open position, in which the bearing bush 32 has been pinched, is more preferable as an initialization position than the closed position.

Figure 13:
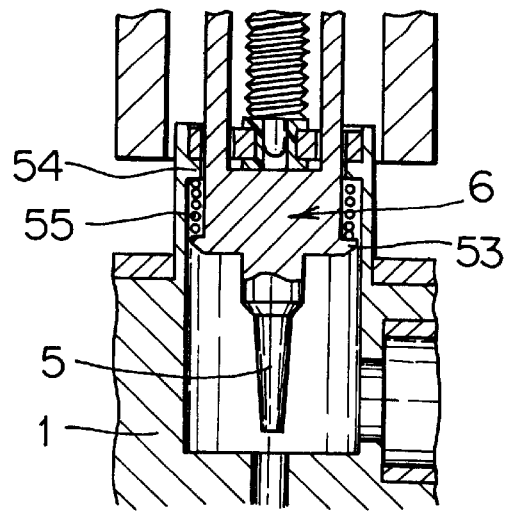
FIG. 13 is a sectional view showing another embodiment of a motor-operated valve which has a spring for urging downward a needle valve element.

The initialization in the fully open state, which is superior in precision than the fully closed state, may generate a noise due to repeated hits of the external thread 20 and the internal thread 16 when the rotor rotates in reverse. To eliminate the noise, it is preferable that the valve element 6 has a flange 53 at a lower outer periphery thereof and a compressed, downwardly urging spring 55 disposed between the flange 53 and a bearing supporting shoulder 54 of the main body 1 as illustrated in FIG. 13. The compressed spring 55 can keep the internal thread 16 to abut against the external thread 20 even when the external thread 20 tends to disengage from the internal thread 16, preventing generation of a noise.

Figure 14:
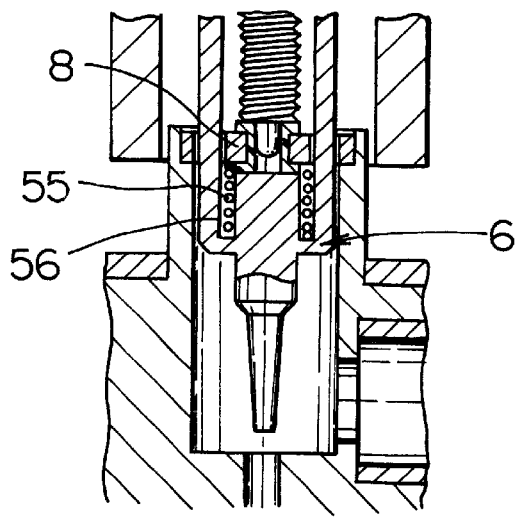
FIG. 14 is a sectional view showing further another embodiment of a motor-operated valve which has a spring for urging downward a needle valve element.

Another valve biasing spring 55 having the same function as that of FIG. 13 is illustrated in FIG. 14. The valve element 6 has a bottom wall formed with a spring receiving recess 56. The downwardly urging spring 55 is compressed to be received between a bottom surface of the spring receiving recess 56 and a lower surface of the bearing 8.

Figure 15:
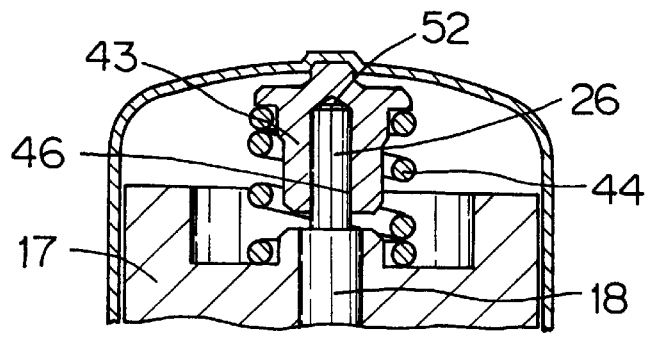
FIG. 15 is a sectional view showing further another embodiment of a motor-operated valve which has a stopper for stopping the upward movement of a valve shaft.

In the above-mentioned motor-operated valve, the shoulder 50 of the rotor 17 abuts against the lower end surface 51 of the shaft supporting piece 43 to stop the upward movement of the rotor 17 at the fully closed position of the valve. Alternatively, as illustrated in FIG. 15, the shaft supporting piece 43 may have a central shaft bearing recess 46 having an end 52 which abuts against the upper end 26 of the shaft 18 to stop the upward movement of the rotor 17.

Figure 16:
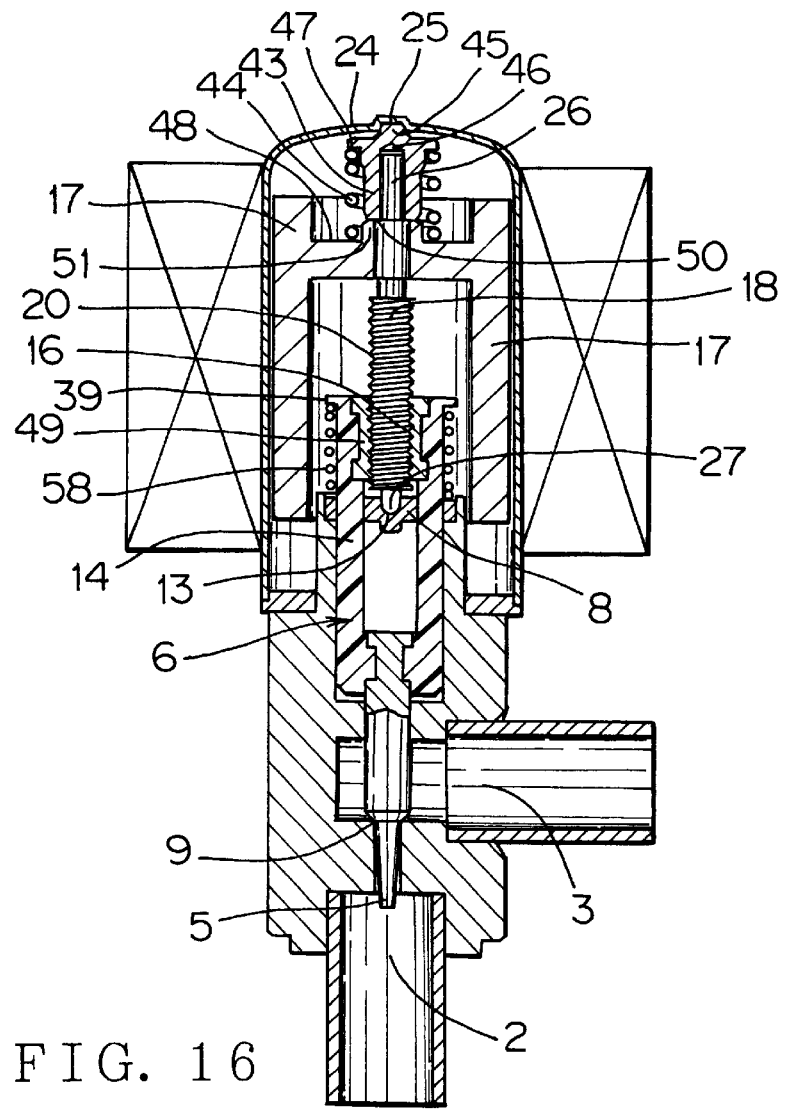
FIG. 16 is a sectional view showing further another embodiment of a motor-operated valve according to the present invention.

FIG. 16 shows further another motor-operated valve embodying the present invention. The motor-operated valve has a shaft 18 with a lower end 27 that is received in a supporting hollow 13 of the bearing 8 to be supported in the same way as the embodiment of FIG. 1. The motor-operated valve has the shaft supporting piece 43 supporting the upper end 26 of the shaft 18 in the same way as the embodiment of FIG. 11. That is, the shaft supporting piece 43 has the engagement projection 45 at an upper end portion thereof, and the engagement projection 45 engages with the hollow 25 formed on the top wall 24 of the housing 22. The shaft supporting piece 43 has a central shaft bearing recess 46 receiving the upper end 26 of the shaft 18. Between the spring supporting portion 47 formed an outer periphery of the shaft supporting piece 43 and the upper surface 48 of the rotor 17, there is mounted the downwardly urging spring 44 to be compressed therein. Furthermore, the valve element 6 has a flange 39 at an upper end thereof, and between the flange 39 and the bearing 8, there is disposed a compressed, downwardly urging spring 58.

In the motor-operated valve having such springs, the downwardly urging spring 44 invariably urges the rotor 17 toward the bearing 8 to stop vertical and lateral movements of the rotor 17, so that the rotor 17 may operate stably with a reduced vibration thereof. A further provision of pulses for closing the valve at the valve closed position occurs an inverse pulse to rotate the rotor temporally in reverse so that the rotor 17 and the valve head 5 tend to move downward and upward in the same way as at the initialization of the valve. However, the downwardly urging spring 44 is urging the valve head 5 against the valve seat 9, preventing fluid leak of the valve element 6.

Meanwhile, the downwardly urging spring 58 urges the internal thread 16 against the external thread 20 that is in a stable state caused by the downwardly urging spring 44. This allows a stable state of the valve head 5, preventing generation of a noise. Note that the downwardly urging spring 44 is larger in resiliency than the downwardly urging spring 58 so that the lower end 27 of the shaft may not disengage from the bearing 8. In addition, the downwardly urging spring 58 has a resiliency enough small not to provide a large load to the valve element 6 when the valve element 6 moves downward.

In the motor-operated valve illustrated in FIG. 16, an upper internal thread piece 49 having the internal thread 16 is a body separately formed from the valve element 6, and the valve head 5 is also a body separately formed from the valve element 6. The valve element 6 has the joining portion 14 joining the lower the valve head 5 to the internal thread piece 49. The separate body construction of the internal thread piece 49 and the valve head 5 allows precise forming of them from various kinds of materials and achieves desirable characters of them. A durable material is applied to a part receiving a considerably larger force.

The internal thread piece 49 and the valve head 5, which have been formed to be the separate bodies, are secured to the joining portion 14 by press fit. When the valve element 6 is made of a resin material, the internal thread piece 49 and the valve head 5 may be secured to the valve element 6 by inset molding. Optionally, the resin material may have a low friction coefficient.

Figure 17A:
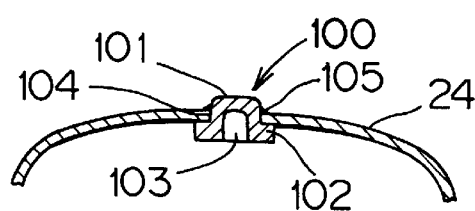
FIGS. 17A and 17B each are a view particularly showing a support member for supporting an upper end of the shaft according to the present invention.
Figure 17B:
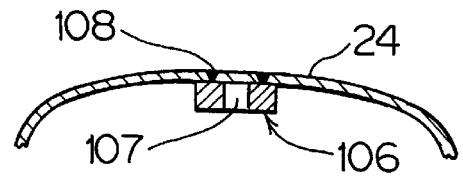

In the above-mentioned embodiment, the top wall 24 of the housing 22 has the hollow for supporting the upper end of the shaft or for receiving the upper end portion of the shaft supporting piece 43. Alternatively, as illustrated in FIG. 17, an end supporting piece 100 may be provided. FIG. 17A shows the end supporting piece 100 having an upwardly projecting portion 101, an outwardly radially extended, lower flange 102, and a downwardly opened recess 103. The projection 101 is upwardly inserted into an opening 104 formed in the top wall 24 to be engaged therewith. The flange 102 is abutted against an inner surface of the top wall 24, and an outer peripheral surface of the projection 101 is secured to the opening 104 of the top wall 24, for example by brazing 105. FIG. 17B shows another supporting piece 106 consisting of a short cylindrical member having a through hole 107. The supporting piece 106 is abutted against an inner surface of the top wall 24 and is secured to the top wall 24, for example by spot welding 108 which is carried out from the outside.

Figure 3:
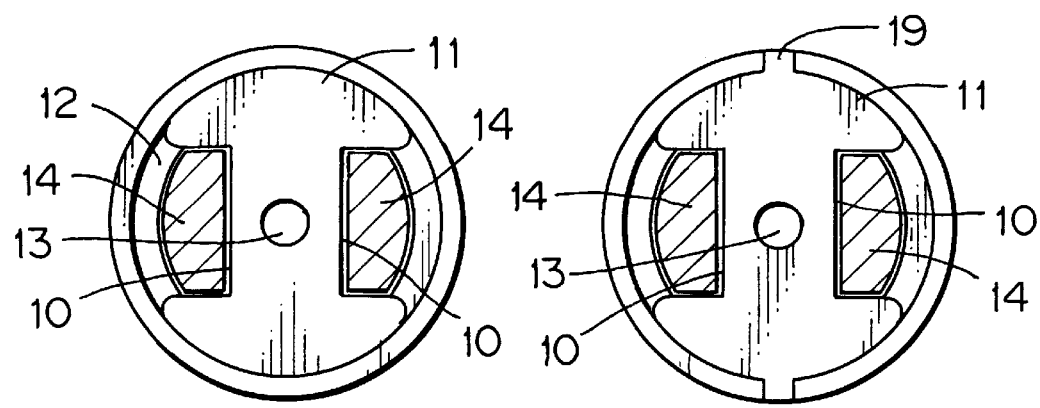
FIGS. 3A and 3B each are a horizontal sectional view particularly showing a bearing plate of the motor-operated valve.
Figure 18A:
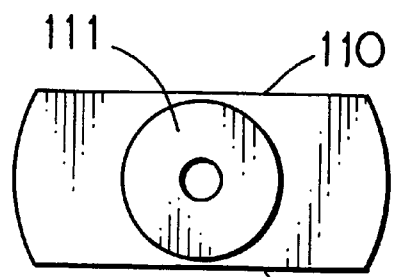
FIGS. 18A and 18B each are a view particularly showing another example of a bearing plate according to the present invention.
Figure 18B:
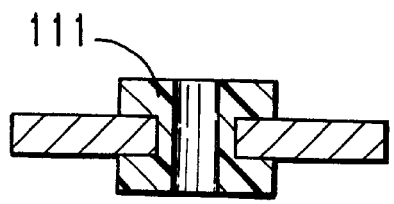

In the above-mentioned embodiment, there is provided a bearing plate like that shown in FIG. 3, which has a guide recess 10 at each side thereof for engaging with the joining portion of the valve element. Alternatively, as illustrated in FIG. 18, there may be provided another bearing plate having a flat end 110 at each side thereof in place of the guide recess 10, which achieves the same function as that of FIG. 3 for preventing a rotational movement of the valve head and for slidingly guiding the valve head. The bearing plate of this embodiment has a bearing bush 111 made of an elastic metal material at a central potion thereof. Each flat end 110 requires no such turning step of the bearing plate as illustrated in FIG. 4 when assembled.

Figure 19A:
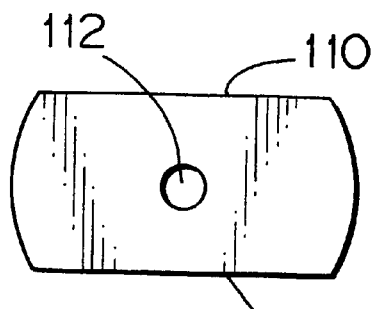
FIGS. 19A and 19B each are a view particularly showing further another example of the bearing plate according to the present invention.
Figure 19B:
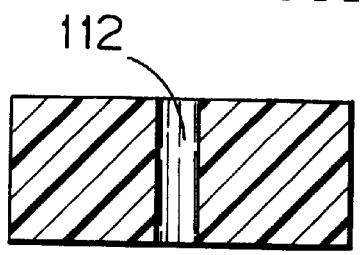

Furthermore, as illustrated in FIG. 19, there may be provided another bearing plate having a flat end 110 at each side thereof like that of FIG. 18. The bearing plate of FIG. 19 is a flat plate made of a synthetic resin material having a high strength and is formed with a central through hole 112 receiving a lower end of the shaft. Such a bearing plate requires no bearing bush to allow a reduced number of parts and a reduced assembling man-hour, resulting in a reduce cost thereof. The bearing plate composing a sliding guide made of a synthetic resin material for the valve element eliminates a noise having a high frequency due to the sliding movement.

Figure 20:
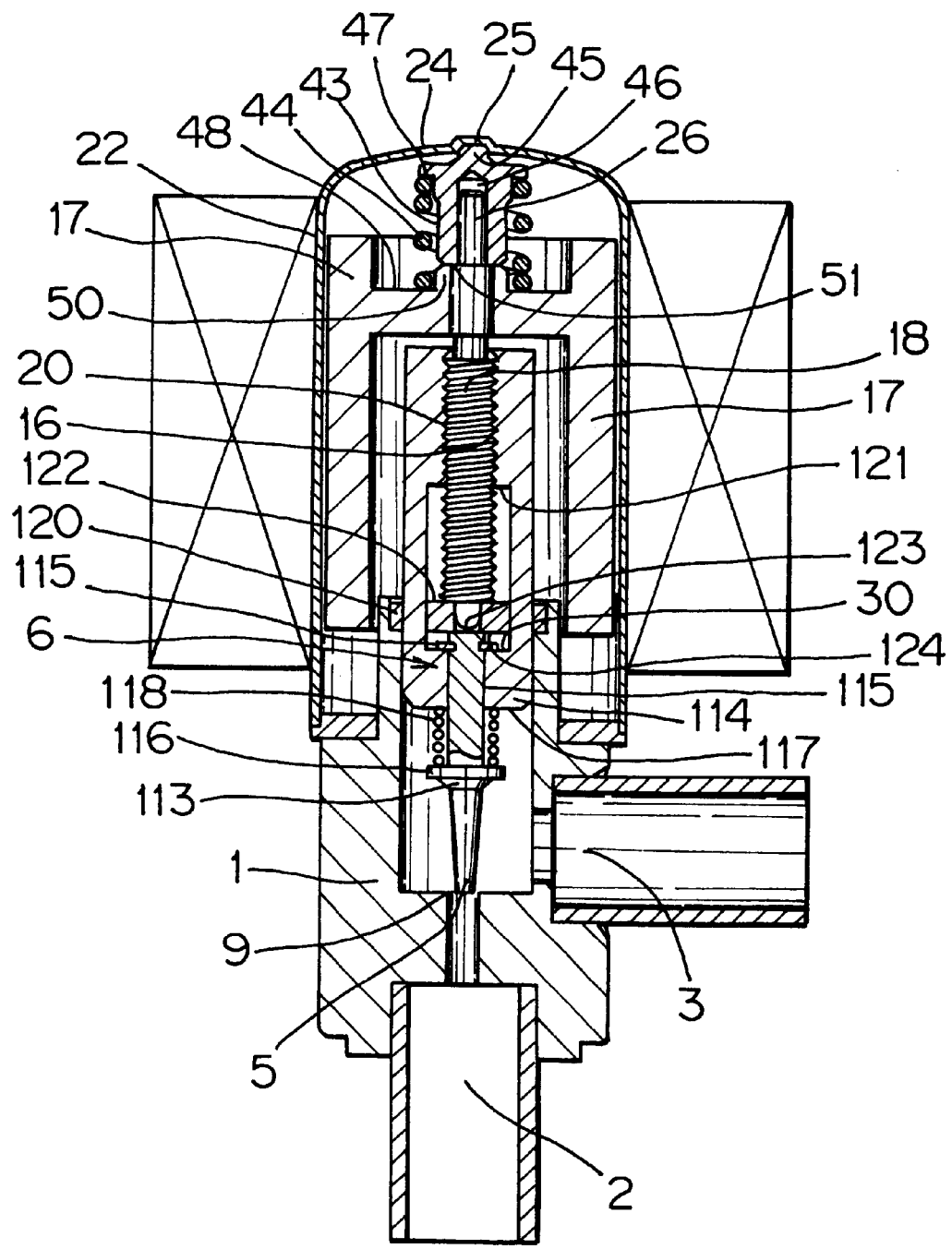
FIG. 20 is a sectional view showing further another embodiment of a motor-operated valve according to the present invention, in which the valve is in a fully open state.
Figure 21:
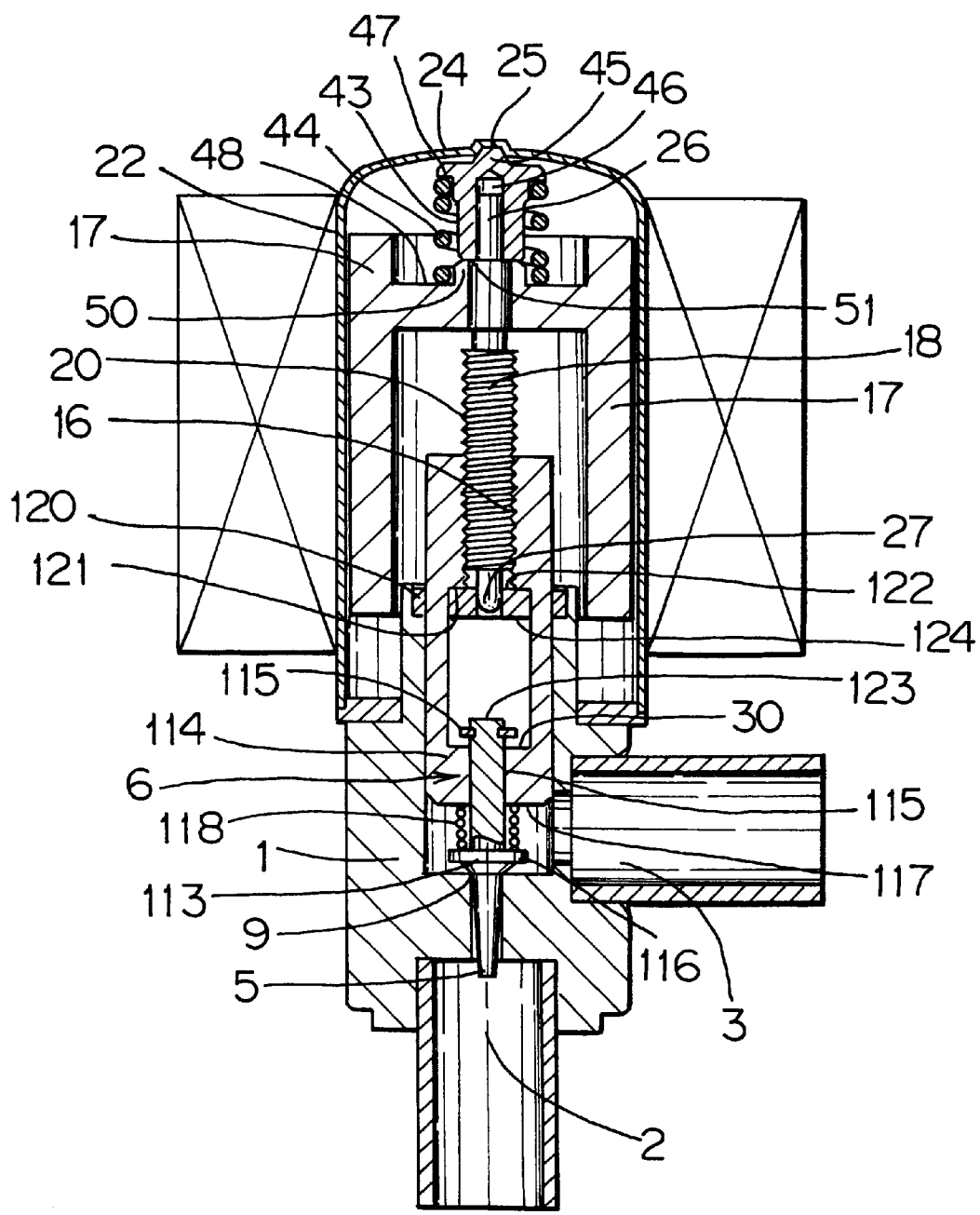
FIG. 21 is a sectional view of the embodiment of FIG. 20, in which the valve is in a fully closed state.
Figure 22:
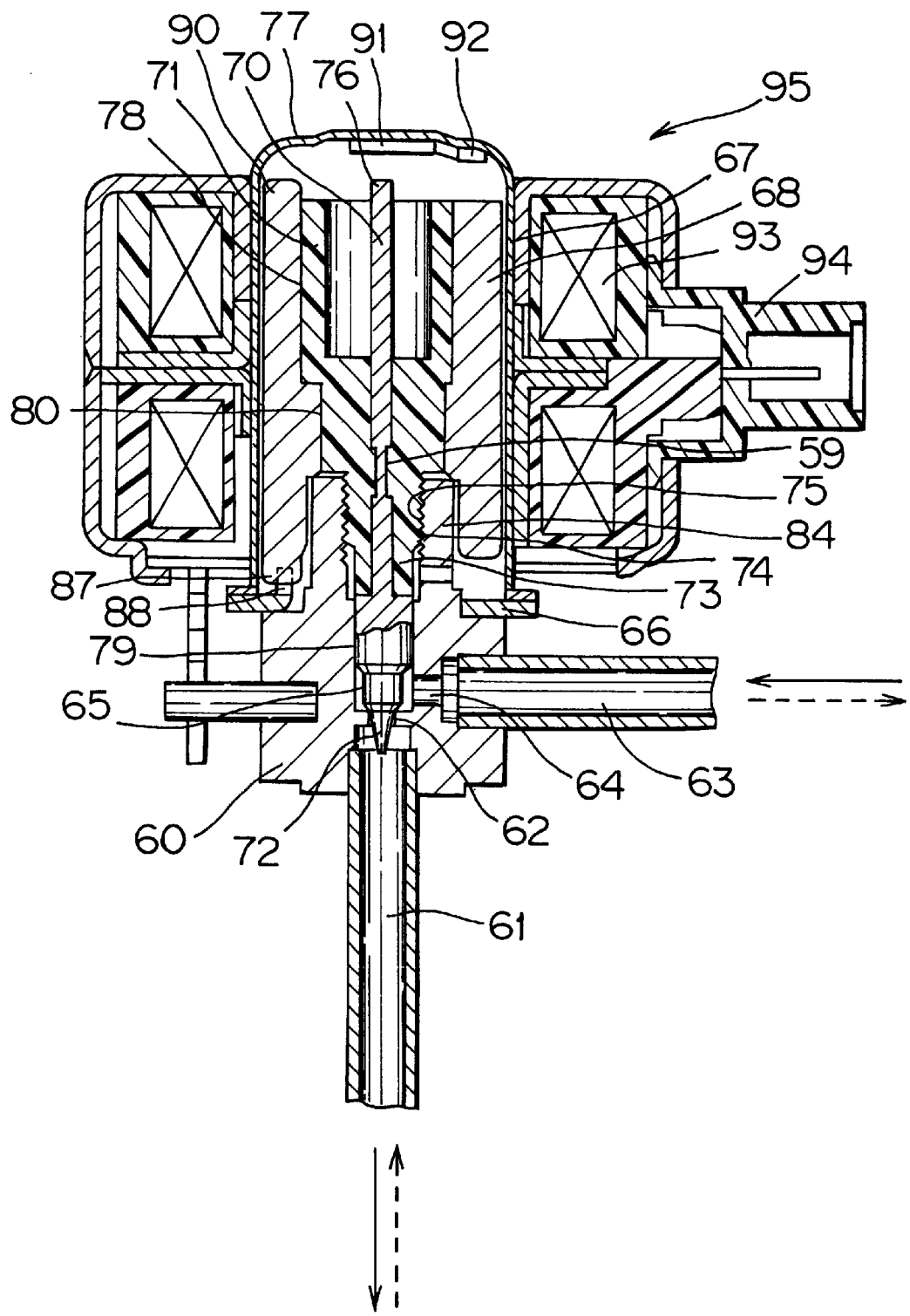
FIG. 22 is a sectional view showing a conventional motor-operated valve.

FIGS. 20 and 21 show another motor-operated valve according to the present invention. The motor-operated valve has a needle valve head 113 separately formed from a valve element 6, and the valve head 113 slidingly engages with a disengagement stopper 115 formed in a lower end portion 114 of valve element 6. The valve head 113 has a top end having the disengagement stopper 115 and an intermediate portion having a spring support 116. Between the spring support 116 and an end surface 117 of the lower end portion 114 of the valve element 6, there is mounted a compressed spring 118. The spring 118 invariably urges the valve head 113 downward, and the disengagement stopper 115 is abutting against the inner bottom surface 30 of the valve element 6 in a released position of the valve head.

In a closed state of the motor-operated valve, as illustrated in FIG. 21, the valve head 113 engages with the valve seat 9. A further rotational movement of the rotor to move the valve element 6 downward compresses the spring 118, so that the rotational force of the rotor is not exerted on the valve seat 9 when the valve head 113 engages with the valve seat 9. This causes no friction force between the valve head 113 and the valve seat 9, eliminating a frictional wear thereof. This state allows a smooth opening operation of the valve.

The motor-operated valve of this embodiment uses the flat bearing plate 120 illustrated in FIG. 19. In a fully closed state of the valve which is shown in FIG. 21, a shoulder 121 formed in an upper end part of the joining portion of the valve element 6 abuts against an upper surface 122 of the bearing plate 120 to stop the valve element 6. Meanwhile, in a fully open state of the valve which is shown in FIG. 20, an upper end 123 of the valve head 113 abuts against a bottom surface 124 of the bearing plate 120 to stop the valve element 6.

Hence, the stopping operations of the fully open and close states of the valve are carried out by the engagement of the flat surfaces. Particularly in the fully closed state of the valve, this construction prevents an inclining movement of the central axis of the valve, so that the internal and external threads may keep to be coaxial with each other to eliminate an undesired lock of the threads. Otherwise, an inclining movement of the central axis of the valve might occur, which may appear in some other embodiments, when the valve closing force of the rotor urges a tapered peripheral surface of the valve head against the valve seat to exert a force to abut the valve head against the valve element.

The bearing plate of FIGS. 20 and 21, which has a guide recess at each side thereof, is used as a member which allows the vertical movement of the valve element but stops the rotation of the valve element. Alternatively, there may be provided a pin projecting from the valve element and a guide formed in the valve main body for guiding the pin. Or, there may be provided a projection on the valve element, which slidingly engages with a groove formed in the valve main body. Or, there may be provided one of conventional means for converting the rotational movement of the rotor to an axial reciprocating movement of the valve element.

Figure 23:
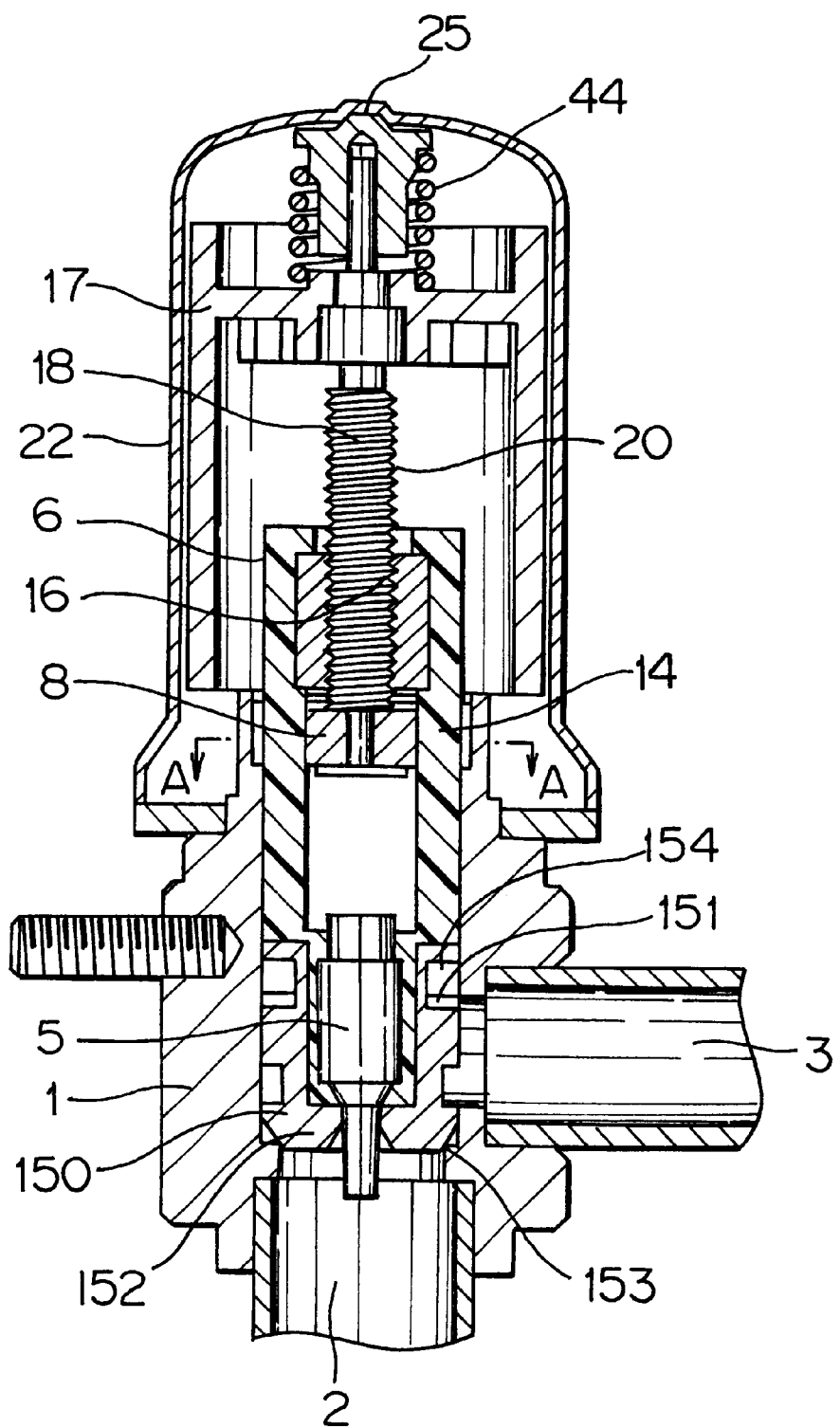
FIG. 23 is a sectional view showing a two-step type motor-operated valve of another embodiment of according to the present invention, in which the valve is in a fully closed state.

Next, another embodiment shown in FIG. 23 will be discussed. This embodiment relates to a two-step type motor-operated valve that has a rotor 17, a shaft 18 secured to the rotor 17, an internal thread 16 formed on the shaft 18, a valve element 6, and a main body 1. The valve element 6 has a valve head 5 at one end portion and an external thread 20 formed on another end portion thereof for engaging with the internal thread 16. The main body 1 is fitted with a main valve 150 via a stopper 151. The main valve 150 is vertically movable. The main body 1 also has a first valve seat 152 engageable with the valve head 5 and a second valve seat 153 engageable with the main valve 150. The main body 1 also has a guide portion 154 for slidingly guiding the valve element 6 to allow the axial reciprocating movement thereof. The shaft 18 is rotatably supported at an upper end thereof by a hollow 25 formed in a top wall of a housing 22 covering the rotor 17 and at a lower end thereof by a bearing 8 fixed on the main body 1.

This embodiment has the downwardly urging spring 44 the same as the embodiment shown in FIG. 11. The downwardly urging spring 44 acts in the same way as discussed of FIG. 11.

The two-step type motor-operated valve, which is provided with the main valve 150 having the first valve seat 152 for the valve head 5, has advantageous effects similar to the previously described embodiments.

As discussed above in detail, each embodiment has a spring to reduce an impact noise generated due to the vertical movement of the rotor or a noise generated when a needle valve element abuts against a bearing plate particularly during an initialization of the valve.

Next, another embodiment (a second embodiment) has a flat spring for eliminating an impact noise generated due to the abutment of a needle valve head against a bearing.

Referring to FIGS. 24 to 28, the second embodiment according to the present invention will be discussed.

Figure 24A:
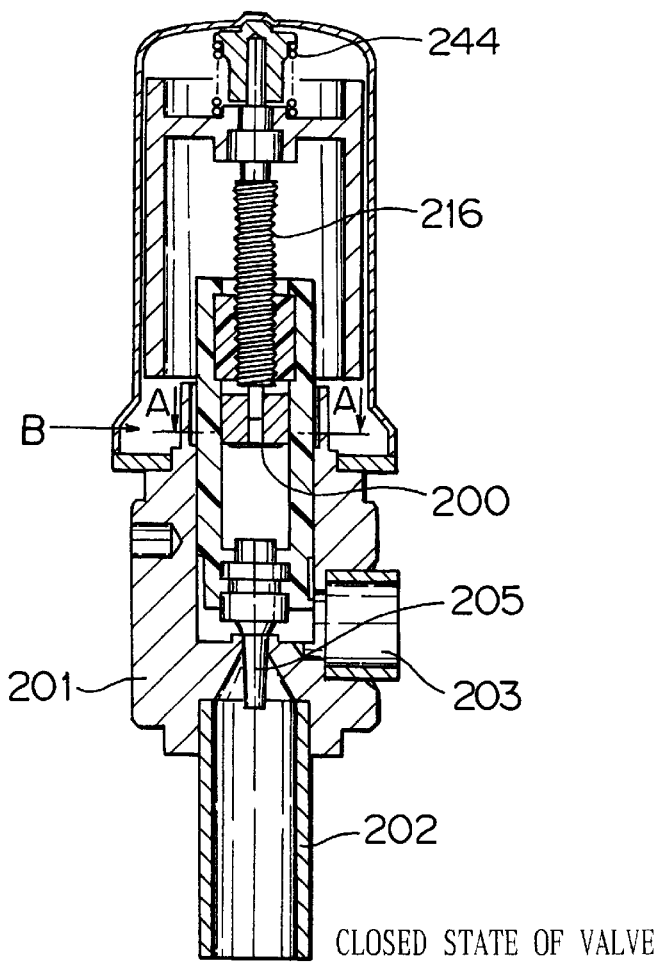
FIGS. 24A to 24C are views showing a motor-operated valve of a second embodiment according to the present invention.
Figure 24B:
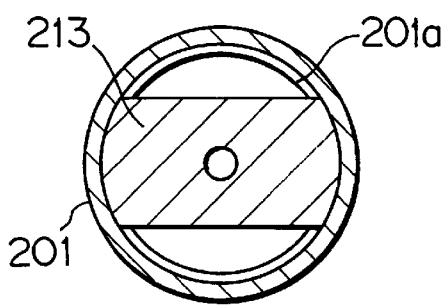
Figure 24C:
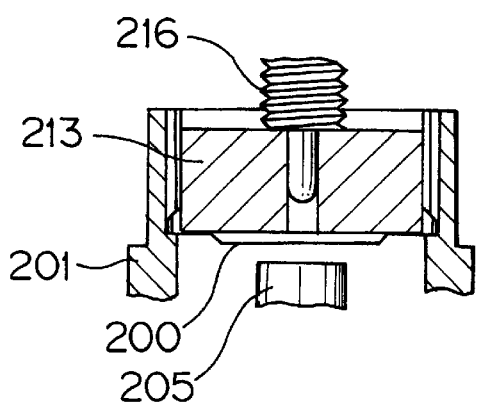
Figure 25:
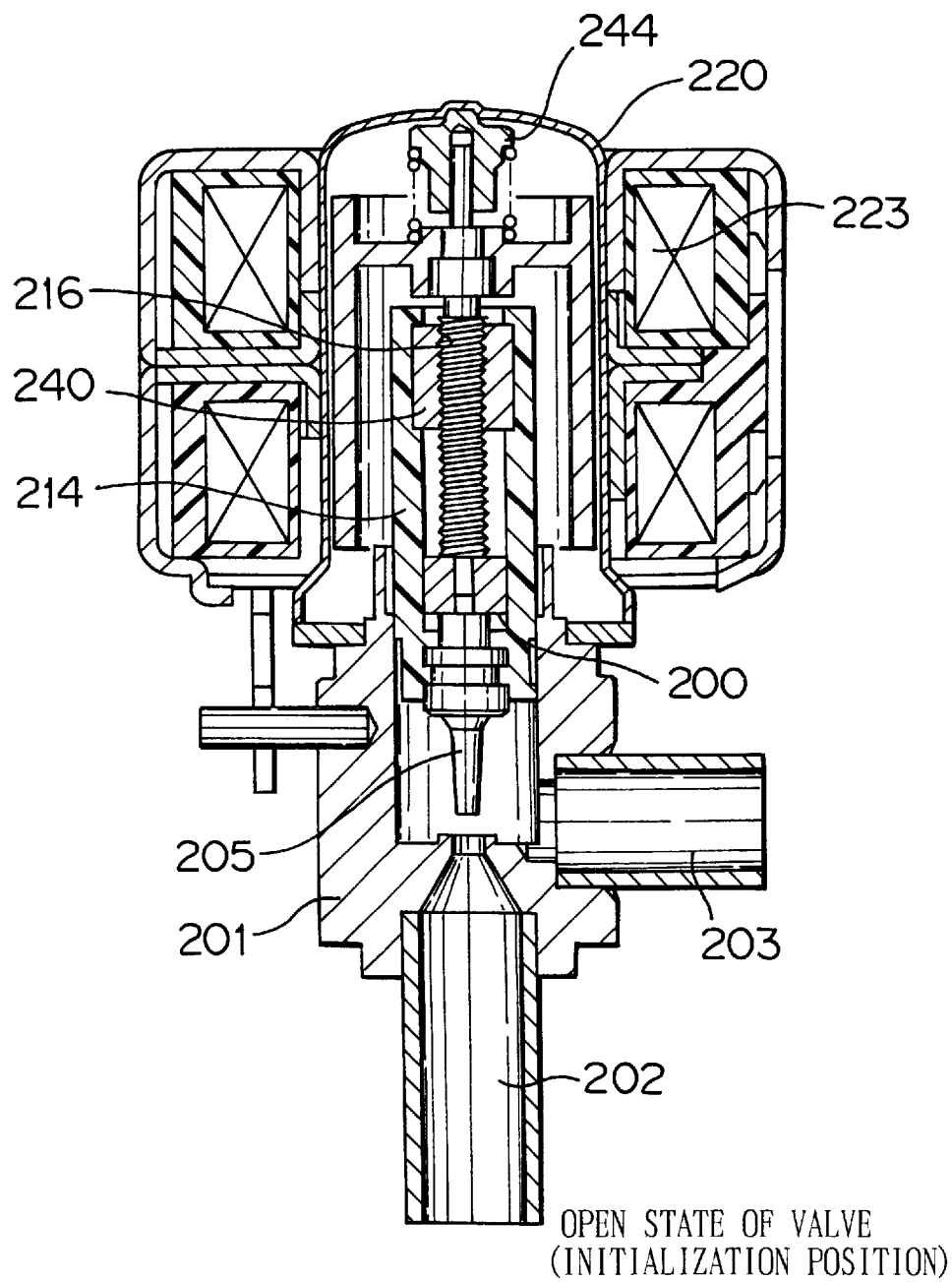
FIG. 25 is a sectional side view showing the motor-operated valve of FIG. 24, in which the valve is in a fully open state.

In the second embodiment, as illustrated in FIGS. 24 to 26, there is provided a flat spring 200 between a bearing 213 and a valve head 205 for downwardly urging the valve head 205 at an initialization position of the valve. FIG. 26 is an enlarged view particularly showing a bearing portion of the second embodiment. In FIGS. 24 to 28, a constitutional element the same as that of FIG. 1 has a reference numeral in which the number of 200 is added to the numeral of the same element of FIG. 1. Thus, the same component will not be discussed again in detail.

Figure 26B:
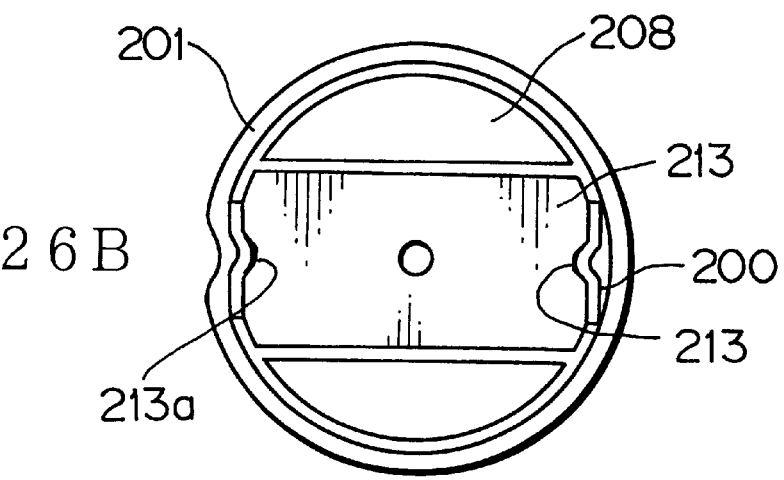
FIGS. 26A to 26C show, the motor-operated valve of FIG. 24 and each are sequentially a sectional view, a plan view, and a perspective view illustrating an assembling step of the motor-operated valve.
Figure 26A:
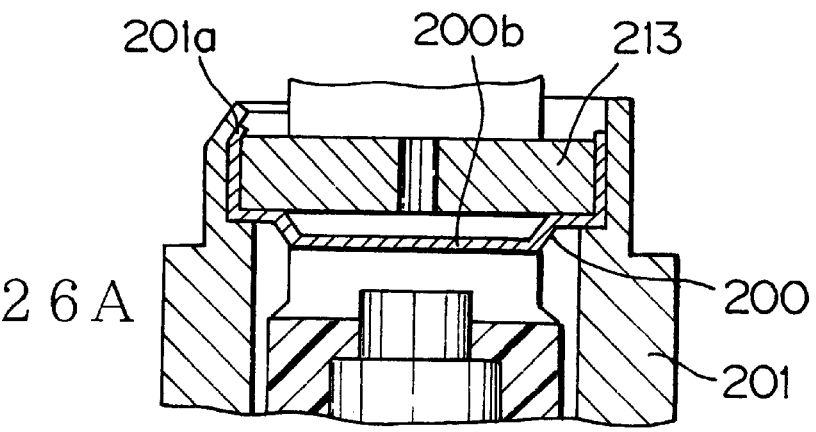
Figure 26C:
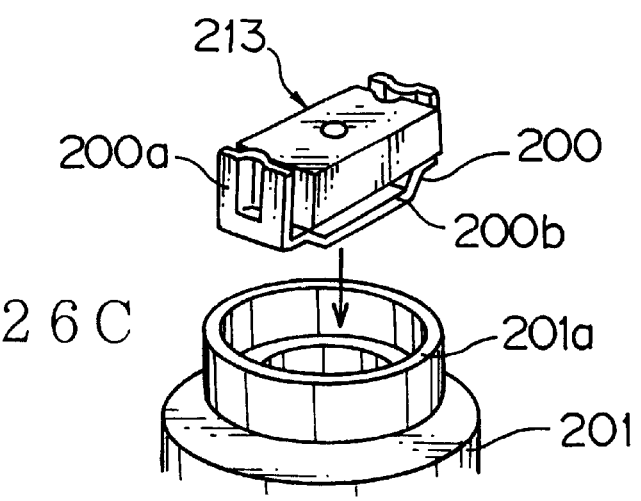

The flat spring 200, as illustrated in FIGS. 26A to 26C, has a rising plate 200a that is used to secure the internal thread 220 to the bearing 213. More specifically, the bearing 213 is formed with a pair of hollows 213a each of which clamps a projection of the rising plate 200a of the flat spring 200, so that the flat spring 200 is integrally secured to the bearing 213.

Figure 27:
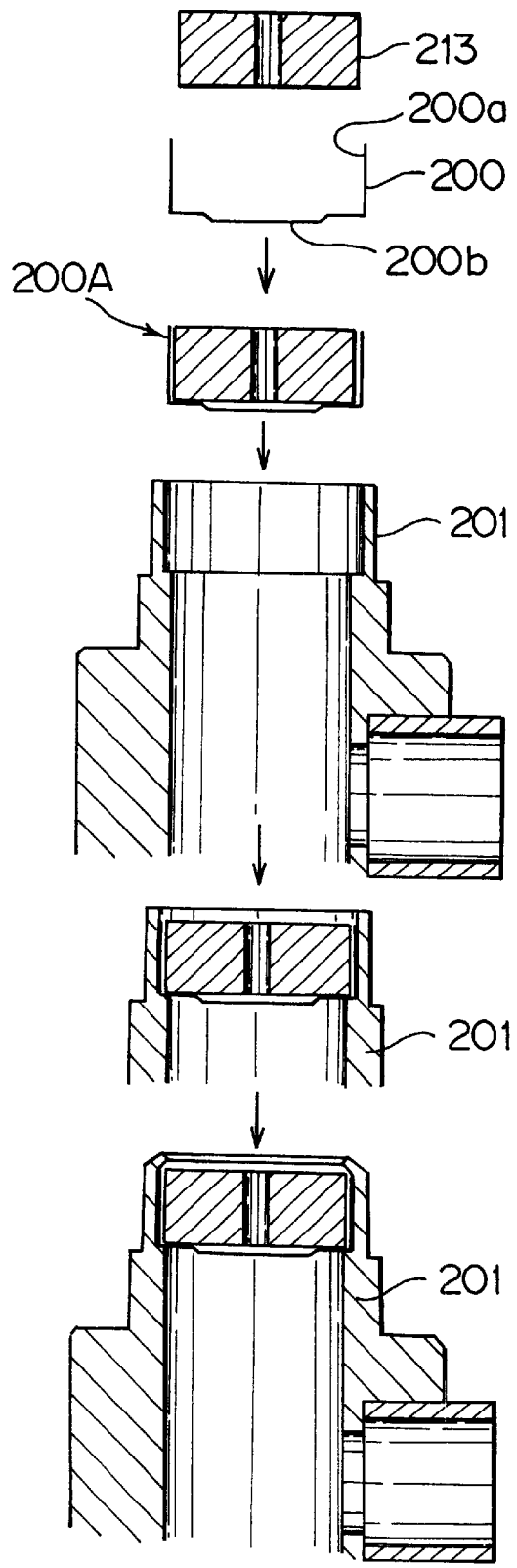
FIG. 27 includes sectional views of the motor-operated valve of FIG. 24 and shows steps for mounting a bearing.

As illustrated in FIG. 26C, a subassembly 200A of the bearing 213 and the flat spring 200 is inserted into a valve main body 201, and the bearing 213 is integrated with the valve main body 201 by clamping a peripheral wall of an upper end portion 201a of the valve main body 201 to the subassembly 200A. FIG. 27 shows sequential steps for the clamping.

The flat spring 200 has a main part 200b that moves forward and backward relative to a bottom surface of the bearing 213 to serve as a spring.

Figures 28A, 28B, 28C:
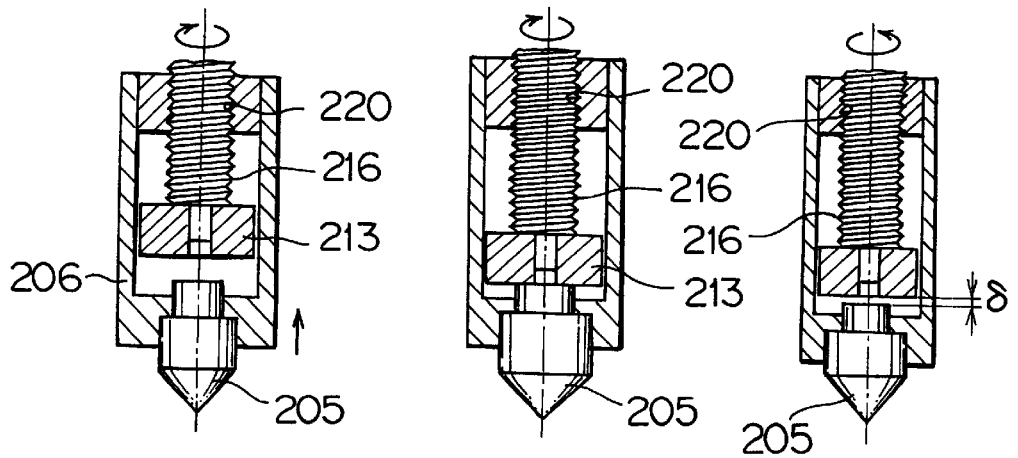
FIGS. 28A to 28E are sectional views of the motor-operated valve of FIG. 24 for showing a function of a flat spring provided in the motor-operated valve.

Next, referring to FIGS. 28A to 28E, the function of the flat spring will be discussed in detail. The valve head 205 which has been in an intermediate position (FIG. 28A) moves toward its closed position (upward) by clockwise rotating a rotor 217 (external thread 216). An upper end of the valve head 205 abuts against the bearing 213 to stop the valve, in which the valve is in its fully open state. The position is defined as an initialization position of the valve (FIG. 28B).

A further power provision of to coils 223 causes the rotor 217 to rotate in reverse (FIG. 28C), that is, to instantaneously rotate the rotor 217 (external thread 216) counterclockwise so that a valve head 205 (internal thread 220) moves downward.

Figures 28D, 28E:
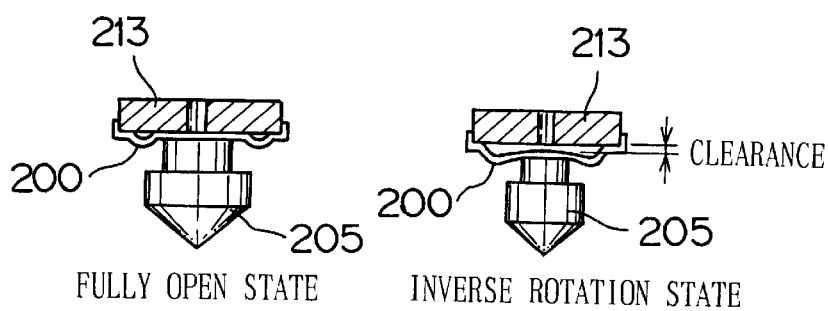

This movement provides a backlash (δ of FIG. 28C) which is a clearance of the internal thread 220 of the valve head 205 relative to the external thread 216. The backlash may generate a vibration noise at the initialization of the valve. In the embodiment, the flat spring 200 disposed between the bearing 213 and the valve head 205 urges the external thread 216 downward at the initialization, reducing the vibration noise due to the backlash. FIG. 28D shows the fully open state, and FIG. 28E shows an inverse rotation state of the valve.

Thus, the second embodiment includes the flat spring 200 that invariably urges the valve head 205 downward to limit the valve head 205 to move upward and downward at the inverse rotation state of the rotor 217. This prevents a noise generated by repeated upward/downward movements of the valve head 205.

Next, a third embodiment of the present invention will be discussed.

The third embodiment includes such an internal thread and a bearing as the previously discussed embodiments. However, the internal thread is made of a synthetic resin material, and the bearing is made of a sintered metal. This allows the bearing to have a strength to receive a larger load and enables a noise reduction.

Figure 29:
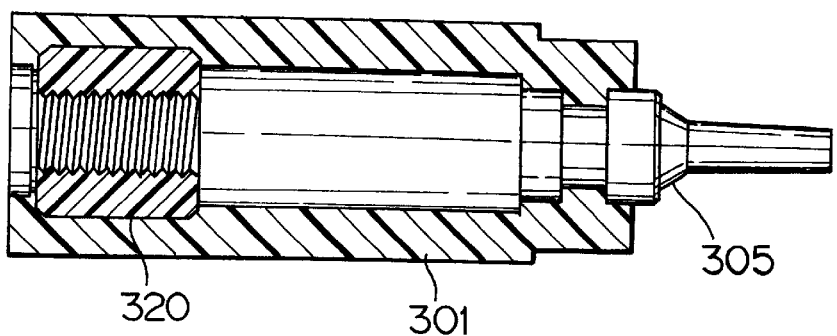
FIG. 29 is a sectional view showing a valve main body of a third embodiment according to the present invention.

Referring to FIG. 29, the reference numeral 320 designates a synthetic resin made internal thread. The internal thread 320 is preliminarily molded from the resin as an insert part. A valve main body 301 is formed from the same resin to constitute a motor-operated valve.

The synthetic resin internal thread 320 has a resiliency to reduce an impact force generated between the external and internal threads during the initialization of the valve. In addition, a complicated thread shape is easily formed. Moreover, since a force for forwarding the threads varies with a frictional coefficient of the threads, the threads may be made of a material allowing a less friction to provide an efficient actuation mechanism for the valve.

The pre-molded internal thread 320 is used for an insert part to mold the valve main body 301 with the same material, resulting in a reduced producing cost of the valve.

Note that a motor-operated valve having a large capacity requires a strength larger than the embodiment of FIG. 29 which has the synthetic resin made actuating members. The embodiment of FIG. 30 has a bearing 313 made of a sintered metal. Thus, the bearing 313 has a strength larger than one made of a synthetic resin material and also has an appropriate friction coefficient.

Figure 30:
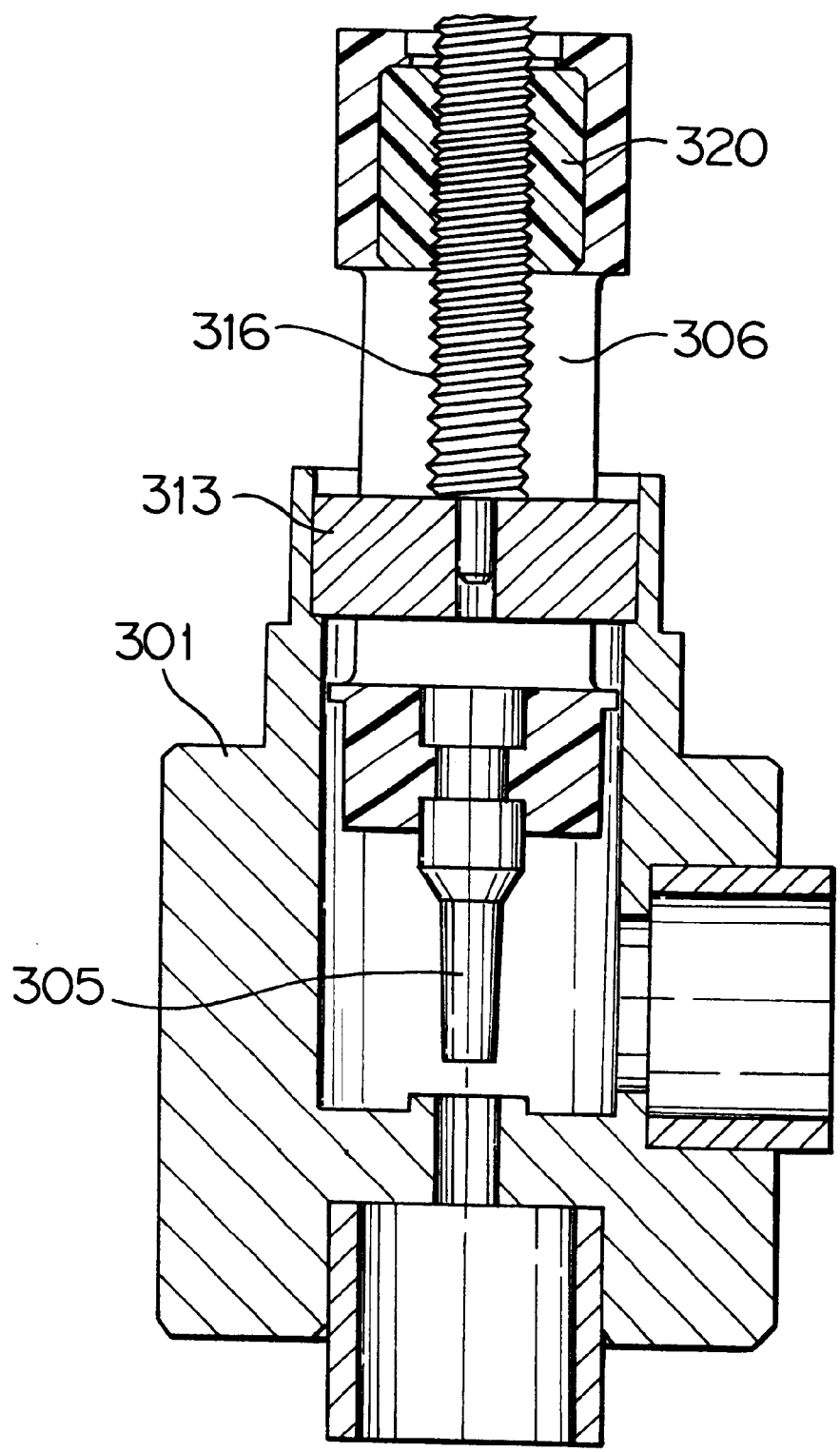
FIG. 30 is a sectional side view showing an alternative example of the motor-operated valve of FIG. 29, in which the valve is in a fully closed state.

The motor-operated valve of FIG. 30 has a large opening for mounting the bearing 313 in the valve main body 301 with ease.

In the third embodiment, the bearing 313 may be made of the synthetic resin material. The bearing 313 is fitted with a flat spring in the same way as the second embodiment. The integrated bearing piece and flat spring are clamped in the valve main body to prevent the rotation and disengagement of the piece. In addition, the flat spring serves as a washer receiving an axial force to compensate the synthetic resin made bearing piece in strength.

INDUSTRIAL APPLICABILITY OF THE INVENTION

A first, second, or third aspect of the invention provides a motor-operated valve in which an axial force of a rotor and a valve element can stop the rotation of the rotor without any specified stopper. This allows a reduced cost and a reduced assembling man-hour. Furthermore, the motor-operated valve operates reliably during its long service life and eliminates a noise generated by a stopper provided in a conventional motor-operated valve. Moreover, each end of a shaft of the rotor is axially supported, so that the rotor can stably rotate. The valve element moves upward and downward without rotation to open and close a valve head. Thus, a valve head of the needle valve abuts against a valve seat without rotation, preventing a frictional wear of the valve head and the valve seat. Furthermore, an upper end of the rotor shaft is supported by a hollow formed in a top wall of a valve housing, so that no additional support is required to support the rotor on the housing, allowing a reduced cost of the motor-operated valve.

In a fourth aspect of the invention, a joining portion comprises a pair of opposing rods. A bearing of the shaft has a guide for slidably guiding the rods, and the guide stops the rotation of the valve element. This construction provides easily the sure stopping and guiding of the valve element without an additional element such as a pin.

In a fifth aspect of the invention, the bearing has a rotation stopper projection engaging with the valve element. The bearing does not rotate due to the engagement of the projection and a valve main body even when the bearing has a circular outer periphery. In addition, the bearing is simple in construction.

In a sixth aspect of the invention, the bearing also has a support recess receiving a lower end of the shaft to transmit thrust of the shaft. Thus, the support recess surely bears the shaft thrust, allowing a stable operation of the motor-operated valve.

In a seventh aspect of the invention, the bearing has a bearing bush made of an elastic material. The bush has a hole receiving the lower end of the shaft. The bush also has a thrust receiving portion protruding from each surface of the bearing. Thus, at a fully closed state of the valve, the lower end of the shaft and an upper end of the valve element pinch the elastic bush to stop the rotor rotation. This allows a noise reduction when the bearing receives the pinching force.

In an eighth aspect of the invention, the bearing is a flat plate made of a synthetic resin material and having a central hole receiving the lower end of the shaft. The bearing plate allows a reduced cost in manufacturing thereof and prevent generation of a noise when the bearing plate functions as a stopper. In addition, the joining portion and sliding portion of the valve element, which may be made of a synthetic resin material, prevent generation of a sliding noise.

In a ninth aspect of the invention, the bearing has a spring upwardly urging the lower end of the shaft. This reduces a noise of the motor-operated valve, since a torsion force of the spring reduces a force for rotating the rotor in reverse due to an inverse pulse generated when the rotor tends to move upward against the valve element at a fully open position of the valve element.

In a tenth aspect of the invention, the valve element has a recess formed on an outer peripheral surface thereof. In the recess, there is provided a slider made of a low friction material. Thus, the valve element does not sway laterally to surely move upward and downward. The valve element also slides with a less resistant force, which enables the valve element to move reliably with a less operational force.

In an eleventh aspect of the invention, the shaft has an upper end directly engaging with a recess formed on a top wall of the valve housing. Thus, no additional member is required to support the upper end of the shaft, reducing a manufacturing cost of the motor-operated valve.

In a twelfth aspect of the invention, the shaft has an end rotatably supported by a bearing. The bearing has projection engaging with a recess formed on a top wall of the valve housing. Thus, the shaft engaging with the bearing rotates stably since the bearing can be precisely machined. In addition, the axial abutment of the shaft bearing against the rotor or against the shaft functions as a stopper of the valve element in the valve closed state. This allows a sure operation for stopping the valve element.

In a thirteenth aspect of the invention, between the bearing and a top surface of the rotor, there is provided a compressed spring for urging downward the rotor. Thus, when a temporary reverse rotation of the rotor occurs due to a further provision of pulses for closing the valve at the fully closed position of the needle valve, the spring urges the shaft downward to prevent an internal thread from disengaging from an external thread. Thereby, a noise of the threads is eliminated, and the valve element is urged downward so that the valve head does not disengage from the valve seat to prevent the leak of fluid thereof.

In a fourteenth aspect of the invention, between the valve element and the valve main body, there is provided another compressed spring urging downward the valve element. Thus, when a temporary reverse rotation of the rotor occurs on initialization of the valve at the fully open position of the needle valve, the spring prevents the internal thread from disengaging from the external thread. Thereby, a noise of the threads is eliminated.

In a fifteenth aspect of the invention, between the valve element and the valve main body, there is provided further another compressed spring urging upward the valve element. Thus, when a temporary reverse rotation of the rotor occurs due to a further provision of pulses for closing the valve at the fully closed position of the needle valve, the spring prevents the internal thread from disengaging from the external thread. Thereby, a noise of the threads is eliminated.

In a sixteenth aspect of the invention, the external thread is provided separately from the valve element to be integrated on the valve element afterward. Thus, the internal thread can be made of a durable material such as a metal even when the valve main body is made of a comparatively low strength material like synthetic resin. The valve main body reduces a manufacturing cost of the valve.

In a seventeenth aspect of the invention, the needle valve may be provided separately from the valve element to be integrated on the valve element afterward. Thus, the valve head can be made of a durable material even when the valve element is made of a comparatively low strength material. The valve head can have a precisely machined portion with ease, providing a reliable valve element.

In an eighteenth aspect of the invention, the valve head has a disengagement preventing member at a top portion thereof and has a spring receiving portion at an intermediate portion thereof. The valve head is disposed at a lower end of the valve element. Between the spring receiving portion and the lower end of the valve element, there is provided further another compressed spring. Thus, only the urging force of the spring is exerted on the valve element with receiving no thrust of the rotor at the fully closed state of the needle valve, preventing the valve head from being pressed into the valve seat.

In a nineteenth aspect of the invention, the joining portion may have an upper end shoulder abutting against a flat face of the shaft bearing when the needle valve is fully closed, so that the rotation of the rotor stops. Thus, the stopping state of the rotor is stabler than when the rotor is stopped by the engagement of an outer peripheral surface of a needle valve with an inner peripheral surface of the valve seat. In addition, there is no lateral deviation of the axis of the valve which otherwise occurs due to reaction forces of the valve main body when the rotor is forcedly stopped. This can keep the internal thread to be co-axial with the external thread, preventing locking of the threads.

Moreover, the second and third embodiments have operational effects described in the following.

(1) The flat spring 200 invariably urges the valve head 205 downward to limit the valve head 205 to move upward and downward during a temporary reverse rotation of the rotor 217. This prevents a noise generated by repeated upward/downward movements of the valve head 205.

(2) The synthetic resin made internal thread 320 has a resiliency to reduce an impact force generated between the external and internal threads during the initialization of the valve. In addition, a complicated thread shape is easily formed. Moreover, since a force for forwarding the threads varies with a frictional coefficient of the threads, the threads may be made of a material allowing a less friction to enable an efficient actuation mechanism for the valve.

The pre-molded internal thread 320 is used for an insert part to mold the valve main body 301 with the same material, resulting in a reduced producing cost of the valve.

The bearing 313 which is made of a sintered metal has a strength larger than one made of a synthetic resin material and also has an appropriate friction coefficient.

What is claimed is:

1. A motor-operated valve comprising:
    a rotor having a shaft formed with an external thread and having a lower end and an upper end,
    a needle valve element having a needle valve head at one end portion thereof, an internal thread engaging with the external thread at another end portion, and a joining portion for joining the valve head to the internal thread,
    a main valve body having a guide portion which allows an axial movement of the valve element, and
    a bearing coupled to the main valve body,
    wherein the lower end of the shaft is disposed within the joining portion, the bearing is coaxially disposed about the joining portion and is coaxially disposed about the guide portion of the valve body that receives the joining portion, the bearing has at least a portion disposed within the joining portion with another portion of the bearing extending externally of the joining portion, and the valve element has a portion thereof engaged with the bearing so as to prevent axial rotation of the valve element.

2. A motor-operated valve comprising:
    a rotor having a shaft formed with an external thread and having a lower end and an upper end,
    a needle valve element having a needle valve head at one end portion thereof, an internal thread engaging with the external thread at another end portion, and a joining portion for joining the valve head to the internal thread,
    a main valve body having a guide portion which allows an axial movement of the valve element, the main valve body having a valve seat, and
    a bearing coupled to the main valve body,
    wherein the lower end of the shaft is disposed within the joining portion, the bearing is coaxially disposed about the joining portion and is coaxially disposed about the guide portion of the valve body that receives the joining portion, the bearing has at least a portion disposed within the joining portion with another portion of the bearing extending externally of the joining portion, and the valve element has a portion thereof engaged with the bearing so as to prevent axial rotation of the valve element.

3. The motor-operated valve set forth in claim 1 wherein the internal thread is made of a synthetic resin material.

4. The motor-operated valve set forth in claim 2 wherein the internal thread is made of a synthetic resin material.

5. The motor-operated valve set forth in claim 1 wherein the joining portion comprises a pair of opposing rods, and the bearing has a guide for slidably guiding the rods, the guide stopping the rotation of the valve element.

6. The motor-operated valve set forth in any one of claims 1 to 5 wherein the bearing has a rotation stopper projection engaging with the main valve body.

7. The motor-operated valve set forth in any one of claims 1 to 5 wherein the bearing has a support recess receiving the lower end of the shaft to receive a thrust of the shaft.

8. The motor-operated valve set forth in any one of claims 1 to 4 wherein the bearing has a bearing bush made of an elastic material, and the bush has a hole receiving the lower end of the shaft and also has a thrust receiving portion protruding from each surface of the bearing.

9. The motor-operated valve set forth in any one of claims 1 to 5 wherein the bearing is a flat plate made of a synthetic resin material and having a central hole receiving the lower end of the shaft.

10. The motor-operated valve set forth in any one of claims 1 to 5 wherein the bearing has a spring upwardly urging the lower end of the shaft.

11. The motor-operated valve set forth in any one of claims 1 to 5 wherein the valve element has a recess formed on an outer peripheral surface thereof, and, in the recess, there is provided a slider made of a low friction material.

12. The motor-operated valve set forth in any one of claims 1 to 5 wherein the shaft has an end directly engaging with a recess formed on a top wall of a valve housing.

13. The motor-operated valve set forth in any one of claims 1 to 5 wherein the shaft has an end rotatably supported by a shaft supporting piece, and the shaft supporting piece has a projection engaging with a recess formed on a top wall of a valve housing.

14. The motor-operated valve set forth in any one of claims 1 to 5 wherein, between the shaft supporting piece and a top surface of the rotor, there is provided a compressed spring for urging downward the rotor.

15. The motor-operated valve set forth in claim 14 wherein, between the valve element and the valve main body, there is provided another compressed spring urging downward the valve element.

16. The motor-operated valve set forth in claim 14 wherein, between the valve element and the valve main body, there is provided further another compressed spring urging upward the valve element.

17. The motor-operated valve set forth in any one of claims 1 to 5 wherein the internal thread is provided separately from the valve element to be integrated on the valve element afterward.

18. The motor-operated valve set forth in any one of claims 1 to 5 wherein the valve head is provided separately from the valve element to be integrated on the valve element afterward.

19. The motor-operated valve set forth in any one of claims 1 to 4 wherein the valve head has a disengagement preventing member at a top portion thereof and has a spring receiving portion at an intermediate portion thereof, the valve head being disposed at a lower end of the valve element, and, between the spring receiving portion and the lower end of the valve element, there is provided further another compressed spring.

20. The motor-operated valve set forth in claim 19 wherein the joining portion has an upper end shoulder abutting against a flat face of the bearing when the needle valve is fully closed, so that the rotation of the rotor stops.

21. The motor-operated valve set forth in any one of claims 1 to 4 wherein the internal thread is preparatorily formed as an insert from the same synthetic resin material as the valve element.

22. The motor-operated valve set forth in any one of claims 1 to 4 wherein the bearing is made of a sintered metal.

23. The motor-operated valve set forth in any one of claims 1 to 4 wherein, between the bearing and the valve head, there is a plate piece having an elastic character for urging downward the valve element in an initialization state of the valve element.

* * * * *